United States Patent
Tsang

(10) Patent No.: US 9,798,290 B2
(45) Date of Patent: Oct. 24, 2017

(54) HOLOGRAPHIC ENCRYPTION OF MULTI-DIMENSIONAL IMAGES AND DECRYPTION OF ENCRYPTED MULTI-DIMENSIONAL IMAGES

(71) Applicant: City University of Hong Kong, Kowloon (HK)

(72) Inventor: Peter Wai Ming Tsang, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 54 days.

(21) Appl. No.: 14/866,698

(22) Filed: Sep. 25, 2015

(65) Prior Publication Data

US 2017/0090418 A1 Mar. 30, 2017

(51) Int. Cl.
*G03H 1/08* (2006.01)
*G03H 1/00* (2006.01)
(Continued)

(52) U.S. Cl.
CPC ......... *G03H 1/0841* (2013.01); *G03H 1/0011* (2013.01); *G03H 1/0808* (2013.01);
(Continued)

(58) Field of Classification Search
CPC .. G03H 1/0841; G03H 1/0011; G03H 1/2286; G03H 1/0808; G03H 2001/0022;
(Continued)

(56) References Cited

U.S. PATENT DOCUMENTS 5,194,971 A 3/1993 Haines
5,483,364 A 1/1996 Ishimoto et al.
(Continued)

FOREIGN PATENT DOCUMENTS

CN 102087503 A 6/2011
CN 102087503 B 7/2012
(Continued)

OTHER PUBLICATIONS

Office Action dated Aug. 23, 2016 for U.S. Appl. No. 14/305,494, 112 pages.
(Continued)

*Primary Examiner* — Jade R Chwasz
(74) *Attorney, Agent, or Firm* — Amin, Turocy & Watson, LLP

(57) ABSTRACT

Cryptographic techniques for encrypting images, and decrypting and reconstructing images, are provided to facilitate preventing unauthorized access to images. A holographic cryptographic component (HCC) generates complex holograms of multi-dimensional source images of a multi-dimensional object scene. The HCC generates phase holograms, based on the complex holograms, using a stochastic hologram generation process, and encrypts the phase holograms to generate encrypted holograms based on a random phase mask, which can be the private encryption key. At the decoding end, an HCC overlays a conjugate phase mask on the encrypted holograms to decrypt them, wherein the decrypted holograms are illuminated with a coherent light source to generate holographic images that reconstruct the source images. The source images are only reconstructed properly if the correct phase mask is used. If HCC applies the encryption process repetitively to the same source image, HCC can generate a different encrypted hologram in each run.

37 Claims, 18 Drawing Sheets

(51) Int. Cl.
  *G03H 1/22* (2006.01)
  *G09C 5/00* (2006.01)
  *G03H 1/26* (2006.01)
(52) U.S. Cl.
  CPC ............. *G03H 1/2286* (2013.01); *G09C 5/00* (2013.01); *G03H 2001/0022* (2013.01); *G03H 2001/0072* (2013.01); *G03H 2001/085* (2013.01); *G03H 2001/2675* (2013.01); *G03H 2223/13* (2013.01)
(58) Field of Classification Search
  CPC ..... G03H 2001/0072; G03H 2001/085; G03H 2001/2675; G03H 2223/13; G03H 1/0005; G03H 1/0443; G03H 1/26; G09C 5/00; G02B 5/32; G02B 2027/0174; G02F 2203/50; H04L 63/0428; H04L 63/061; H04L 2209/24; H04L 9/14; H04L 9/0816; H04L 9/0822
  USPC ....... 713/150, 162, 168, 170, 171, 189, 190; 359/9, 2, 10, 11, 15, 21, 32, 35
  See application file for complete search history.

(56) References Cited

U.S. PATENT DOCUMENTS

| | | |
|---|---|---|
| 5,696,601 A | 12/1997 | Metcalfe et al. |
| 5,974,228 A | 10/1999 | Heitsch |
| 7,088,480 B1 | 8/2006 | Javidi et al. |
| 7,212,630 B2 | 5/2007 | Javidi |
| 7,221,760 B2 | 5/2007 | Javidi et al. |
| 8,150,033 B2 | 4/2012 | Javidi et al. |
| 8,274,705 B2 | 9/2012 | Chang |
| RE43,707 E | 10/2012 | Kimpe et al. |
| 8,320,694 B2 | 11/2012 | Chang |
| 8,384,973 B2 | 2/2013 | Leister |
| 8,654,048 B2 | 2/2014 | Collings et al. |
| 2004/0255236 A1 | 12/2004 | Collart |
| 2005/0041746 A1 | 2/2005 | Rosen et al. |
| 2005/0122549 A1 | 6/2005 | Goulanian et al. |
| 2006/0001921 A1 | 1/2006 | Bailey et al. |
| 2006/0078113 A1 | 4/2006 | Javidi |
| 2007/0024999 A1 | 2/2007 | Crossland et al. |
| 2007/0086662 A1 | 4/2007 | Cho et al. |
| 2008/0218864 A1 | 9/2008 | Javidi |
| 2009/0002787 A1 | 1/2009 | Cable et al. |
| 2009/0207466 A1 | 8/2009 | Bucklay |
| 2009/0219380 A1 | 9/2009 | Cable |
| 2010/0085276 A1 | 4/2010 | Cable |
| 2010/0149139 A1 | 6/2010 | Kroll et al. |
| 2011/0228365 A1 | 9/2011 | Tsang et al. |
| 2011/0261427 A1 | 10/2011 | Hart et al. |
| 2012/0008181 A1 | 1/2012 | Cable et al. |
| 2013/0265623 A1 | 10/2013 | Sugiyama et al. |
| 2016/0110564 A1 | 4/2016 | Tsang |

FOREIGN PATENT DOCUMENTS

| | | |
|---|---|---|
| CN | 103279916 A | 9/2013 |
| WO | 2005059660 A2 | 6/2005 |
| WO | 2005059881 | 6/2005 |
| WO | 20050059881 A2 | 6/2005 |
| WO | 2006134404 | 12/2006 |
| WO | 20060134404 A1 | 12/2006 |
| WO | 2009121709 | 10/2009 |

OTHER PUBLICATIONS

Cathey, Jr., "Phase Holograms, Phase-Only Holograms, and Kinoforms", Dec. 1969. Retrieved on Aug. 23, 2016, 2 pages.
Falou, et al. "Segmented phase-only filter binarized with a new error diffusion approach", Journal of Optics A: Pure and Applied Optics, Feb. 11, 2005. Retrieved on Aug. 23, 2016, 10 pages.
Kiire, et al. "Three-dimensional displacement measurement for diffuse object using phase-shifting digital holography with polarization imaging camera", Optical Society of America, Dec. 1, 2011. Retrieved on Aug. 23, 2016, 6 pages.
Tsang, "Novel method for converting digital Fresnel hologram to phase-only hologram based on bidirectional error diffusion", Optics Express, Sep. 27, 2013. Retrieved on Aug. 23, 2016, 7 pages.
Knuth, "Digital Halftones by Dot Diffusion", ACM Transactions on Graphics, vol. 6, No. 4, Oct. 1987. Retrieved on Aug. 23, 2016, 29 pages.
Yagle, "Complex Numbers and Phasors", The University of Michigan, Ann Arbor, Fall 2005. Retrieved on Aug. 23, 2016, 7 pages.
Kirk, et al. "A generalisation of the error diffusion method for binary computer generated hologram design", Optics Communications 92 (1992) 12-18. Retrieved on Aug. 23, 2016, 8 pages.
Yeom, et al. "Phase-only hologram generation based on integral imaging and its enhancement in depth resolution", Chinese Optics Letters, Dec. 10, 2011. Retrieved on Aug. 23, 2016, 4 pages.
Office Action dated Sep. 19, 2016 for U.S. Appl. No. 14/516,332, 57 pages.
Tudela et al. "Full complex Fresnel holograms displayed on liquid crystal devices." Journal of Optics A: Pure and Applied Optics, Institute of Physics Publishing, J. Opt. A: Pure Appl. Opt. 5 (2003), Jan. 17, 2003, S1-S6. Retrieved on Mar. 27, 2014, 6 pages.
Hsieh et al. "Improvement of the complex modulated characteristic of cascaded liquid crystal spatial light modulators by using a novel amplitude compensated technique." OE Letters, Optical Engineering, Jul. 2007/vol. 46(7), Jul. 2, 2007. Retrieved on Mar. 27, 2014, 3 pages.
Makowski et al. "Complex light modulation for lensless image projection." Chinese Optics Letters, col. 9 (12), 120008(2011), Dec. 10, 2011. Retrieved on Mar. 27, 2014, 3 pages.
Hsueh, et al. "Computer-generated double-phase holograms" published in Applied Optics; Dec. 15, 1978. Retrieved on Jan. 6, 2014, 10 pages.
Reichelt et al. "Full-range, complex spatial light modulator for real-time holography." Optics Letters vol. 37, No. 11, Jun. 1, 2012, pp. 1955-1957. Retrieved on Dec. 6, 2013, 3 pages.
Li et al. "Color holographic display using a phase-only spatial light modulator." Digital Holography and 3D Imaging, Technical Digest, Apr. 21-25, 2013. Retrieved on Jan. 15, 2014, 3 pages.
Song et al. "Optimal synthesis of double-phase computer generated holograms using a phase-only spatial light modulator with grating filter." Optics Express vol. 20, No. 28, Dec. 31, 2012. Retrieved on Mar. 27, 2014, 10 pages.
Liu et al. "Complex Fresnel hologram display using a single SLM," Applied Optics, vol. 50, No. 34, Dec. 1, 2011, pp. 128-135. Retrieved on Jan. 6, 2014, 8 pages.
Tsang, et al. "Novel method for converting digital Fresnel hologram to phase-only hologram based on bidirectional error diffusion", Optics Express, Oct. 7, 2013. Retrieved on Mar. 27, 2014, 7 pages.
Yeom et al. "Phase-only hologram generation based on integral imaging and its enhancement in depth resolution." Chinese Optics Letters, col. 9(12), Dec. 10, 2011. Retrieved on Mar. 27, 2014, 4 pages.
Buckley. "Holographic Laser Projection Technology." SID International Symposium Digest of Technical Papers 2008, pp. 1074-1079. Retrieved on Mar. 27, 2014, 6 pages.
Cable et al. "Real-time Binary Hologram Generation for High-quality Video Projection Applications." SID International Symposium Digest of Technical Papers 2004, pp. 1431-1433. Retrieved on Mar. 27, 2014, 3 pages.
Buckley. "Real-Time Error Diffusion for Signal-to-Noise Ratio Improvement in a Holographic Projection System." Journal of Display Technology, vol. 7, No. 2, Feb. 2011, pp. 70-76. Retrieved on May 30, 2013, 6 pages.
Wikipedia. "Floyd-Steinberg Dithering" published online at [http://en.wikipedia.org/wiki/Floyd%E2%80%93Steinberg_dithering], last modified on Oct. 23, 2014. Retrieved on Feb. 5, 2015, 2 pages.
Gerchberg et al. "A Practical Algorithm for the Determination of Phase from Image and Diffraction Plane Pictures." OPTIK, vol. 35 (No. 2), pp. 237-246. Retrieved on Jan. 15, 2014, 10 pages.

(56) References Cited

OTHER PUBLICATIONS

Weng et al. "Generation of real-time large computer generated hologram using wavefront recording method." Optics Express, vol. 20, No. 4, Feb. 13, 2012, pp. 4018-4023. Retrieved on Jan. 15, 2014, 6 pages.
Tsang et al. "Holographic video at 40 frames per second for 4-million object points." Optics Express, vol. 19, No. 16, Aug. 1, 2011, pp. 15205-15211. Retrieved on Jan. 15, 2014, 6 pages.
Tsang et al. "Fast conversion of digital Fresnel hologram to phase-only hologram based on localized error diffusion and redistribution," Opt. Express 22, 5060-5066 (2014). Retrieved on Mar. 26, 2016, 7 pages.
Tashima, et al., "Known plaintext attack on double random phase encoding using fingerprint as key and a method for avoiding the attack," Jun. 21, 2010 / vol. 18, No. 13 / Optics Express / pp. 13772-13781. Retrieved on Jan. 16, 2015, 10 pages.
Peng, et al. "Known-plaintext attack on optical encryption based on double random phase keys," Optics Letters / vol. 31, No. 8 / Apr. 15, 2006 / pp. 1044-1046. Retrieved on Jan. 17, 2015, 3 pages.
Situ, et al., "Double random-phase encoding in the Fresnel domain," Optics Letters / vol. 29, No. 14 / Jul. 15, 2004 / pp. 1584-1586. Retrieved on Jan. 16, 2015, 3 pages.
Refregier, et al. "Optical image encryption based on input plane and Fourier plane random encoding," Apr. 1, 1995 / vol. 20, No. 7 / Optics Letters / pp. 767-769. Retrieved on Jan. 17, 2015, 3 pages.
Unnikrishnan, et al. "Optical encryption by double-random phase encoding in the fractional Fourier domain," Jun. 15, 2000 / vol. 25, No. 12 / Optics Letters / pp. 887-889. Retrieved on Jan. 17, 2015, 3 pages.
ISO/IEC. "Information technology—Automatic identification and data capture techniques—QR Code 2005 bar code symbology specification" ISO/IEC 18004: Second Edition—Sep. 1, 2006, Retrieved on Jan. 16, 2015, 8 pages.
Ren, et al. "Secure and noise-free holographic encryption with a quick-response code," Chin. Opt. Lett. 12, Jan. 10, 2014. Retrieved on Feb. 11, 2015, 4 pages.
Barrera, et al., "Optical encryption and QR codes: Secure and noise-free information retrieval," Mar. 11, 2013 / vol. 21, No. 5 / Optics Express / pp. 5373-5378. Retrieved on Jan. 16, 2015, 6 pages.
Zhang, et al. "Vulnerability to chosen-plaintext attack of a general optical encryption model with the architecture of scrambling-then-double random phase encoding," Optics Letters / vol. 38, No. 21 / Nov. 1, 2013, pp. 4506-4509. Retrieved on Jan. 17, 2015, 4 pages.
Frauel, et al., "Resistance of the double random phase encryption against various attacks," Aug. 6, 2007 / vol. 15, No. 16 / Optics Express /pp. 10253-10265. Retrieved on Jan. 16, 2015, 12 pages.
Carnicer, et al. "Vulnerability to chosen-cyphertext attacks of optical encryption schemes based on double random phase keys," Optics Letters / vol. 30, No. 13 / Jul. 1, 2005 / pp. 1644-1646. Retrieved on Jan. 17, 2015, 3 pages.
Gong, et al. "Multiple-image encryption and authentication with sparse representation by space multiplexing," Applied Optics, vol. 52, No. 31, Nov. 1, 2013, pp. 7486-7493. Retrieved on Mar. 12, 2015, 8 pages.
Chen, et al. "Optical color image encryption based on Arnold transform and interference method", Optics Communications 282 (2009) pp. 3680-3685. Retrieved on Jan. 17, 2015, 6 pages.
Chen, et al. "Double random phase encoding using phase reservation and compression", J. Opt. 16 (2014) 025402 (7pp). Retrieved on Jan. 17, 2015, 8 pages.
Non-Final Office Action for U.S. Appl. No. 14/029,144 dated Nov. 6, 2015, 29 pages.
Office Action for U.S. Appl. No. 14/516,332 dated Feb. 16, 2016, 54 pages.
Final Office Action dated Mar. 30, 2016 for U.S. Appl. No. 14/029,144, 22 pages.
Office Action dated Apr. 1, 2016 for U.S. Appl. No. 14/076,717, 44 pages.
Dezhao Kong; Liangcai Cao; Hao Zhang; Qingsheng He; Guofan Jin; "Holographic lensless interference encryption based on single spatial light modulator"; 2016 IEEE 14th International Conference on Industrial Informatics (INDIN); Year: Feb. 2016; pp. 562-566.
Notice of Allowance dated May 24, 2017 for U.S. Appl. No. 14/516,332, 113 pages.

1100

1200

HOLOGRAPHIC ENCRYPTION OF MULTI-DIMENSIONAL IMAGES AND DECRYPTION OF ENCRYPTED MULTI-DIMENSIONAL IMAGES

TECHNICAL FIELD

The subject disclosure relates generally to holograms, e.g., to holographic encryption of multi-dimensional images and decryption of encrypted multi-dimensional images.

BACKGROUND

Image encryption has been an area of interest for a number of decades, as it can protect pictorial content, which is dedicated to a targeted community, from being observed by unauthorized or illegitimate viewers. The technology of image encryption has found numerous important applications in, for example, consumer, industrial, commercial, communication, and military sectors. In general terms, the concept of an image encryption can be briefly explained as follows. In an encoder, a source image can be converted into a new form, which generally can be referred to as the ciphertext, with the incorporation of a secret encryption key. The key can be another image or can be a string of symbols. It is preferable that the ciphertext be significantly different from the source image, so that it is meaningless to anyone who observes it directly. In the decoder, the ciphertext can be reverted to the source image if the correct secret key, which can be exclusive owned, possessed, or used by legitimate viewers, is presented.

As the failure of an image encryption method can potentially inflict serious monetary loss and security breach, research on the developing of sophisticated image encryption methods has been conducted vigorously for many years. While developers have been working to come up with an encryption method wherein the secret encryption key cannot be revealed through some form of attacks, at the same time, there are a significant number of people, commonly referred to as the cryptanalysts, who are also attempting to develop methods for deducing the secret key of different image encryption methods through various kinds of attacks.

The emergence of digital holography, fueled by the recent advancement on the computing and the display technologies, has instigated a new direction in image encryption. Being different from a two-dimensional (2-D) optical image (such as one captured by a traditional camera), a hologram can be a 2-D complex image that can be capable of representing a three-dimensional (3-D) image. In general, a hologram image can be comprised of high frequency fringe patterns that can bear little clue on the pictorial content it represents. Due to this significant property relating to holograms, encryption of the hologram of a source image often can be more difficult to attack by cryptanalysts than the encryption of the source image directly. However, conventional holographic encryption techniques can suffer from a number of deficiencies or disadvantages, including, that images (e.g., reconstructed images) that have been reconstructed based on conventional holographic encryption techniques can be undesirably noisy, the cryptographic process can suffer from undesirably poor reconstructed image quality or the data size may have to be decreased in order to try to enhance the relatively poor reconstructed image quality, the decryption process can be undesirably complicated due to the encryption being conducted in both the spatial and spectral domains, the cryptographic process can have undesirably complicated hardware and/or optical setups for the decoder, and/or the cryptographic process still can be vulnerable to attacks, such as correlation attacks and attacks based on the family of plain text attacks.

The above-described description is merely intended to provide a contextual overview relating to digital holograms and cryptography, and is not intended to be exhaustive.

SUMMARY

The following presents a simplified summary of various aspects of the disclosed subject matter in order to provide a basic understanding of some aspects described herein. This summary is not an extensive overview of the disclosed subject matter. It is intended to neither identify key or critical elements of the disclosed subject matter nor delineate the scope of such aspects. Its sole purpose is to present some concepts of the disclosed subject matter in a simplified form as a prelude to the more detailed description that is presented later.

One or more embodiments, such as one or more systems, methods, computer readable storage mediums, and techniques disclosed herein, relate to encrypting and decrypting content using a holographic cryptographic process(es). Disclosed herein is a system comprising at least one memory that stores executable components; and at least one processor, coupled to the at least one memory, that executes or facilitates execution of the executable components. The executable components comprise a hologram generator component that generates a set of complex holograms based at least in part on a set of source images of a multi-dimensional object scene. The executable components also comprise a holographic cryptographic component that applies a stochastic hologram generation process to facilitate generation of the set of complex holograms, to facilitate generation of a set of phase holograms based at least in part on the set of complex holograms, and to encrypt the set of phase holograms using a random phase mask as a private encryption key to facilitate cryptographically securing the set of source images, wherein the set of phase holograms represents, at least in part, the set of source images, and wherein the set of phase holograms is generated based at least in part on random information derived from the stochastic hologram generation process.

Also disclosed herein is a system comprising at least one memory that stores executable components; and at least one processor, coupled to the at least one memory, that executes or facilitates execution of the executable components. The executable components comprise a holographic cryptographic component that receives a set of encrypted holograms associated with a set of source images and decrypts the set of encrypted holograms to generate a set of decrypted holograms based at least in part on a conjugate phase mask, wherein the set of encrypted holograms is based at least in part on a set of phase holograms that represent, at least in part, the set of source images and are derived from a set of complex holograms via a stochastic hologram generation process, and wherein the conjugate phase mask inversely corresponds to a random phase mask used to encrypt the set of phase holograms to generate the set of encrypted holograms. The executable components also comprise a display component that presents a set of holographic images that is generated in response to illumination of at least a portion of the set of decrypted holograms using a coherent light beam, wherein the set of holographic images reconstruct and correspond to the set of source images.

Also disclosed herein is a method that comprises generating, by a system comprising a processor, a set of phase holograms from a set of complex holograms based at least in part on applying a stochastic hologram generation process in connection with generating the set of complex holograms, wherein the set of phase holograms is generated based at least in part on random information derived from the stochastic hologram generation process, and wherein the set of phase holograms represents, at least in part, a set of source images of a multi-dimensional object scene. The method also comprises encrypting, by the system, the set of phase holograms based at least in part on a random phase mask to facilitate cryptographically securing visual information relating to the set of source images.

Further disclosed herein is a non-transitory computer-readable medium storing computer-executable instructions that, in response to execution, cause a system comprising a processor to perform operations. The operations comprise generating a set of phase-only holograms from a set of complex holograms based at least in part on applying a stochastic hologram generation process during generating of the set of complex holograms, wherein the set of phase-only holograms is based at least in part on random data generated during the stochastic hologram generation process, and wherein the set of phase-only holograms represents, at least in part, a set of source images of a multi-dimensional object scene. The operations further comprise encrypting the set of phase-only holograms based at least in part on a random phase mask to facilitate cryptographically securing information relating to the set of source images.

The disclosed subject matter also includes a system comprising means for generating a set of phase holograms based at least in part on a stochastic hologram generation process that is applied to a set of complex holograms, wherein the set of phase holograms is generated based at least in part on random information generated during the stochastic hologram generation process, and wherein the set of phase holograms represents, at least in part, a set of multi-dimensional source images of a multi-dimensional object scene. The system also comprises means for encrypting the set of phase holograms based at least in part on a random phase mask to facilitate cryptographically securing information relating to the set of multi-dimensional source images.

The following description and the annexed drawings set forth in detail certain illustrative aspects of the disclosed subject matter. These aspects are indicative, however, of but a few of the various ways in which the principles of the disclosed subject matter may be employed, and the disclosed subject matter is intended to include all such aspects and their equivalents. Other advantages and distinctive features of the disclosed subject matter will become apparent from the following detailed description of the disclosed subject matter when considered in conjunction with the drawings.

DETAILED DESCRIPTION

Figure 1:
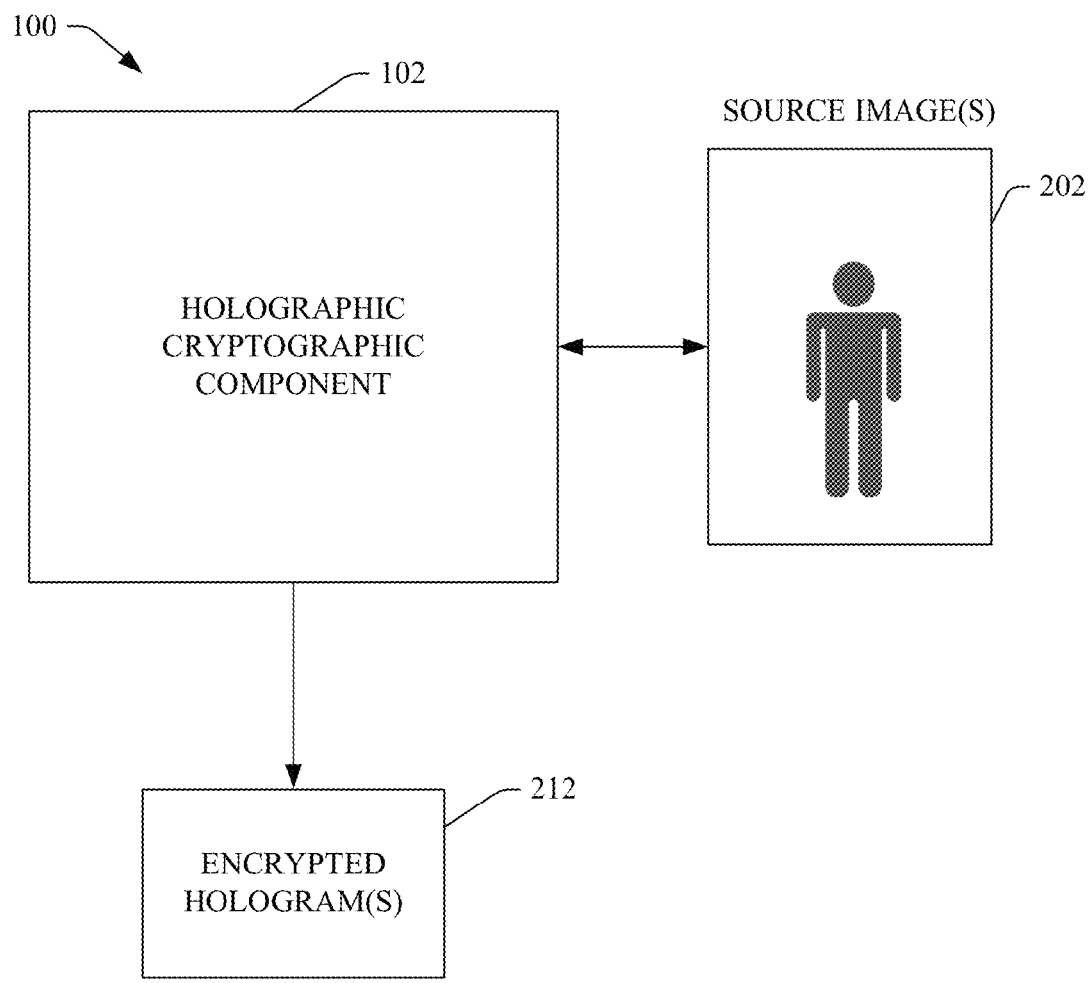
FIG. 1 illustrates a block diagram of an example system that can facilitate performing desirable encryption of content using a holographic cryptographic process, in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

It can be desirable to protect image data using cryptographic techniques (e.g., image encryption and decryption), for example, to prevent unauthorized access to video and image data, enforce and manage digital rights (e.g., digital rights management), and copyright protection. A conventional encryption system can comprise an encoder that can receive source data X as input and can convert the source data X into a different form Y (e.g., encrypted data Y, which can be generally referred to as ciphertext) based on a secret key K. The secret key can be another image or a string of symbols, for example. It can be important for the ciphertext to be significantly different from the source image, so that it can be meaningless to anyone who observes it directly. As the encrypted data Y is composed by the source data X and the secret key K, it generally will not reveal the source data X.

A conventional decryption system can comprise a decoder that, using the correct secret key (e.g., secret key K), can recover the source data, or at least a usable version of the source data, from the encrypted data Y. For instance, the decoder can receive the encrypted data Y, and can apply the secret key K to the encrypted data Y to convert the encrypted data Y into recovered data X' that can correspond to (e.g., be the same or at least substantially the same as) the original source data X. The ciphertext can be reverted to the source image or a usable version of the source image if the correct secret key, which can be exclusively owned or used by legitimate viewers, is presented. The decryption process may or may not be lossless, depending on the encryption and decryption processes employed, and recovered data X' can be different from the original source data X, although it can still be acceptable, within a certain tolerance, for many types of applications.

As the failure of an image encryption method can inflict serious monetary loss and/or security breach, research on the development of sophisticated image encryption methods has been conducted vigorously for many years. One of the main objectives of these works is to come up with an encryption method so that the secret encryption key cannot be revealed through some form of attack(s) by an attacker. While much research has been performed to try to develop a secure encryption system, counter research on cracking encryption systems (e.g., deriving the secret key from the source and encrypted data) is also quite vibrant. People working in the area of data encryption and decryption are commonly referred to as cryptanalysts. Attacks on the encoder are usually based on correlation, plain text, known plain text, or chosen plain text methods. However, an encoder can be quite difficult to attack or crack if it has the following attack resistant properties: 1) the source data X, secret key K, and encrypted data Y are very weakly correlated; 2) the encrypted data Y and the secret key K cannot be predicted in its current form, or in the spectral domain, for all input of source data X; 3) the encrypted data Y and the secret key K cannot be predicted in its current form, or in the spectral domain, for all output Y; 4) a slight deviation in the input of source data X will lead to significant changes in the encrypted data Y in its current form, or in the spectral domain; and 5) for the same input of source data X, the encrypted data Y is different in each run of the encryption process.

In general, encryption techniques generate the same result for the same input and encryption key, which can be a secret key. As such, the secret key can be deduced through attacks (e.g., a correlation attack, an attack from a family of plain text attacks (e.g., plain text attack, known plain text attack, or chosen plain text attack), or other type of attack) by an attacker if the source and the encrypted data are known by the attacker.

Conventional encryption methods, like the Rivest, Shamir, and Adleman (RSA) encryption method, can be computationally intensive and typically are suitable for handling a relatively small amount of data. However, image data, particularly video and/or holographic image data, can comprise a large amount of data, which can make the use of conventional encryption methods, like the RSA encryption method, less desirable.

With the emergence of digital holography, fueled by advancement of computing and display technologies, there has been some development done in the area of holographic encryption. Being different from a two-dimensional (2-D) optical image, such as one captured by a traditional camera, a hologram can be a 2-D complex image that can be capable of representing a three-dimensional (3-D) image. In general, a hologram image can comprise high frequency fringe patterns that can bear relatively little clue on the pictorial content the hologram image represents. Due to this property, encrypting the hologram of a source image often can be more difficult to attack by cryptanalysts that the encryption of the source image directly.

Some conventional holographic encryption techniques developed have been based on a double random phase encoding (DRPE) framework (using a double random phase algorithm (DRPA)). In this approach, the source image $I(x,y)$ can be first overlaid with a random phase mask $K_1(x,y)$ (the 1$^{st}$ encryption key) to change the phase angle of each of its pixels to a random value, resulting in a complex image $I_R(x,y)$. Next, $I_R(x,y)$ can be Fourier transformed to its frequency spectrum, $\hat{I}_R(\omega_x,\omega_y)$. Note that $\hat{I}_R(\omega_x,\omega_y)$ can be interpreted as a complex image with the value of each pixel representing a frequency component of $I_R(x,y)$. A random phase mask $K_2(\omega_x,\omega_y)$, which can be taken as the second encryption key, can be added to $\hat{I}_R(\omega_x,\omega_y)$ to give a new image $\hat{I}_{R2}(\omega_x,\omega_y)$. The encrypted ciphertext hologram, $H(u,v)$, can be obtained by applying Fourier transform on $\hat{I}_{R2}(\omega_x,\omega_y)$. Based on the same principle, the DRPE method also can be realized with a Fractional Fourier transform or a Fresnel transform, instead of a Fourier transform. Recently, techniques that can employ a quick response (QR)-code for a somewhat more noise-free reconstruction of the encrypted images have also been reported.

However, the conventional DRPE methods can be inherently susceptible to plaintext attack, if, for example, the cryptanalyst can access the encoder and generate the ciphertext hologram of selected source images. As is known with such conventional DRPE methods, the random phase mask on the transform plane can be deduced from the inverse Fourier transform of the ciphertext hologram corresponding to the source image of a Dirac impulse (e.g., a single dot). Attempts to decrease the vulnerability of the DRPE framework have been made by scrambling the pixels of the source image or spatial multiplexing of multiple images. However, the incorporation of spatial rearrangement can only increase the difficulty in obtaining the encryption key, rather than prevent it. There have been other measures employed to attempt to prevent the Plaintext attack on the DRPE method by preserving only the phase information on the encrypted hologram. One deficiency of such conventional measures is that the reconstructed image may not be visible or may have poor quality.

One particular conventional cryptographic technique employs a holographic double random phase (HDRP) algorithm to perform encryption. This HDRP algorithm has been shown to be somewhat effective in encrypting optical images, text, and numerical data. However, images (e.g., reconstructed images) that have been reconstructed based on the HDRP algorithm can be undesirably noisy and can suffer from a number of other disadvantages or undesirable qualities.

One disadvantage of the HDRP cryptographic process is that it can have an undesirably complicated decryption process due to the encryption being conducted in both the spatial and spectral domains. Another disadvantage of the HDRP cryptographic process is that it can have undesirably complicated hardware and/or optical setups for the decoder. Still another disadvantage of the HDRP cryptographic process is that it can be vulnerable to attacks, such as correlation attacks and attacks based on the family of plain text attacks. Yet another disadvantage of the HDRP cryptographic process is that it can suffer from undesirably poor reconstructed image quality or the data size may have to be decreased in order to try to enhance the relatively poor reconstructed image quality.

Still another method has been developed wherein, at the encoder end, the source image to be encrypted can be geometrically changed in certain ways (e.g., via scaling and translation) and added with contents that are unknown to the user, before generating a phase-only hologram based on the geometric changes and unknown contents. The phase-only hologram can be encrypted with a random phase mask which can be taken as the encryption key. In the decoder, the source image can be recovered and observed visually if the encrypted hologram is overlaid with the conjugate phase mask (e.g., the conjugate of the encryption key random phase mask), and illuminated with a coherent beam. The method can involve only a single random phase mask in the encryption, and can be highly resistant to attacks (e.g., a correlation attack, an attack from a family of plain text attacks) as there the encrypted hologram can be very different in multiple runs of encryption of the same source image. Despite the success of this technique, the source image may be geometrically changed after encryption, which may not be acceptable in some applications.

To that end, presented are techniques for encrypting multi-dimensional (e.g., 3-D or 2-D) visual images, and decrypting and reconstructing multi-dimensional visual images, to facilitate security in image and holographic communications, preventing unauthorized access to images (e.g., video and image data), digital rights management of images, and copyright protection of images. Employing a multi-stage encryption process (e.g., a single random phase encryption (SRPE) process), during the first stage, a holographic cryptographic component can generate complex holograms based at least in part on (e.g., that can represent and correspond to) multi-dimensional (e.g., 3-D or 2-D) source images of a multi-dimensional object scene. For each source image, the complex hologram representing the source image also can be referred to as a source hologram or complex source hologram, wherein the holographic cryptographic component can generate the complex source hologram as an on-axis complex hologram having an angle of incidence of 0 degrees or an off-axis hologram having angles of incidence along the x-direction and y-direction.

As part of the multi-stage encryption process, to facilitate encrypting the multi-dimensional source images and efficient production of encrypted holograms, the holographic cryptographic component can generate phase holograms (e.g., phase-only holograms) that can, at least in part, represent the multi-dimensional source images, based at least in part on the complex holograms that can be part of global holograms, using a stochastic hologram generation process, comprising the SRPE process, which can facilitate randomizing the encryption of the multi-dimensional source images. In that regard, in the second stage of the multi-stage encryption process, in connection with each source image, the holographic cryptographic component can generate (e.g., randomly generate), or select (e.g., randomly select) from a group of images, one or more multi-dimensional (e.g., 3-D or 2-D) images (e.g., different image(s) from the source image), and can convert the one or more multi-dimensional images (e.g., secondary image(s)) into one or more complex holograms (e.g., off-axis or on-axis complex secondary hologram(s)) that can represent or correspond to the one or more multi-dimensional images, wherein the angles of incidence along the x-direction and y-direction for a complex secondary hologram can be different from the respective angles of incidence of the complex source hologram. Such multi-dimensional image(s) also can be referred to as a secondary hologram(s).

In the third stage of the multi-stage encryption process, for each source hologram, the holographic cryptographic component can add, combine, or integrate the one or more complex secondary holograms to or with the complex source hologram to generate a new complex hologram, which also can be referred to as a global hologram or global complex hologram. The holographic cryptographic component can convert the global complex hologram to a phase hologram (e.g., a phase-only hologram), which also can be referred to as a global phase hologram. As the global phase hologram comprises the source hologram (e.g., in phase-only form) and one or more (random) secondary holograms (e.g., in phase-only form), the global phase hologram, as a whole, can be very different from its constituent holograms, the source hologram and the one or more secondary holograms.

In the fourth stage of the multi-stage encryption process, with respect to each source hologram, the holographic cryptographic component can add a random phase mask (e.g., a fixed, randomly generated phase mask), which can be employed as the private encryption key, to the global phase hologram to generate an encrypted hologram (e.g., encrypted phase hologram) that, at least in part, can represent or correspond to the original multi-dimensional source image. The encrypted holograms can be stored in memory or communicated via a desired communication link (e.g., a wireline or wireless communication link), as desired. By employing the stochastic hologram generation process, even for the same object (e.g., source image or object within a source image), the holographic cryptographic component can generate different holograms (e.g., different encrypted phase holograms) in repetitive runs of the encryption process. This can facilitate better securing the data (e.g., encrypted image data) and resisting attacks on the data (e.g., resisting correlation attacks, attacks based on the family of plain text attacks, or other types of attacks on the data).

To reconstruct the original source multi-dimensional visual images, a holographic cryptographic component (e.g., a holographic cryptographic component at the decoding end) can receive (e.g., obtain, retrieve, etc.) the encrypted holograms, for example, from memory or via the communication link. At the decoding end, the holographic cryptographic component can overlay a phase mask, which can correspond to the encryption key (e.g., which can be the conjugate of the random phase mask), on the encrypted holograms. The encrypted holograms, with the conjugate phase mask overlaid thereon, can be illuminated using a coherent light source to facilitate generating and displaying reconstructed and decrypted multi-dimensional visual images (e.g., multi-dimensional holographic images) that can represent or correspond to (e.g., at least can be substantially the same as) the original source multi-dimensional source visual images. As an encrypted hologram comprises encrypted information relating to the source hologram and the one or more secondary holograms, the decryption of the encrypted hologram, by overlaying the conjugate phase mask, and illuminating the encrypted hologram, with the conjugate phase mask overlaid thereon, can be reconstructed at non-overlapping regions from the global phase hologram (e.g., when the conjugate phase mask is the correct decryption key). The holographic cryptographic component or display component can facilitate separating the desired reconstructed holographic image(s) representing the original source image from those non-overlapping regions associated with the source hologram. An original source image is only reconstructed properly as a corresponding holographic image if the correct phase mask (e.g., appropriate conjugate phase mask) is used at the decoding end. In some implementations, the decryption process employed by the holographic cryptographic component at the decoding end can be performed or realized optically or numerically by the holographic cryptographic component, for example using a computer, a graphic processing unit (GPU), and/or a field-programmable gate array (FPGA).

Turning to FIG. 1, illustrated is a block diagram of an example system 100 that can facilitate performing desirable encryption of content (e.g., multi-dimensional visual images) using a holographic cryptographic process, in accordance with various aspects and embodiments of the disclosed subject matter. The system 100 can perform such holographic cryptographic process, for example, to facilitate security of communication of content (e.g., image and holographic communications), preventing unauthorized access to content (e.g., video and image data), digital rights management of content, and copyright protection of content.

The system 100 can comprise a holographic cryptographic component 102 that can employ a holographic cryptographic process, comprising a holographic encryption process, to encrypt content, such as, for example, one or more visual images (e.g., multi-dimensional images), although other types of content can be encrypted. In some implementations, the holographic encryption process can be or can comprise a single random phase encryption (SRPE) process, which can be a multi-stage encryption process, and also can include a stochastic hologram generation process. Using the holographic encryption process, the holographic cryptographic component 102 can encrypt one or more multi-dimensional visual images of a multi-dimensional (e.g., 3-D or 2-D) object scene to produce (e.g., generate) one or more ciphertext holograms (e.g., random phase holograms), which can be based at least in part on one or more phase holograms (e.g., a phase-only hologram (POH), phase-specific hologram, or pure phase hologram) and a random phase mask that can be associated with the one or more phase holograms. A phase hologram generated via the holographic encryption process and associated with the random phase mask also can be referred to as a random phase hologram. The holographic cryptographic component 102, by employing the SRPE process, can desirably perform the encryption of content using only a single random phase mask as the encryption key (e.g., the SRPE process only requires a single random phase mask as a private encryption key). The SRPE process can be relatively low in complexity, and it and the encrypted content derived from the SRPE process can be highly resistant to attacks (e.g., correlation attacks, plain text attacks, or other types of attacks).

Figure 2:
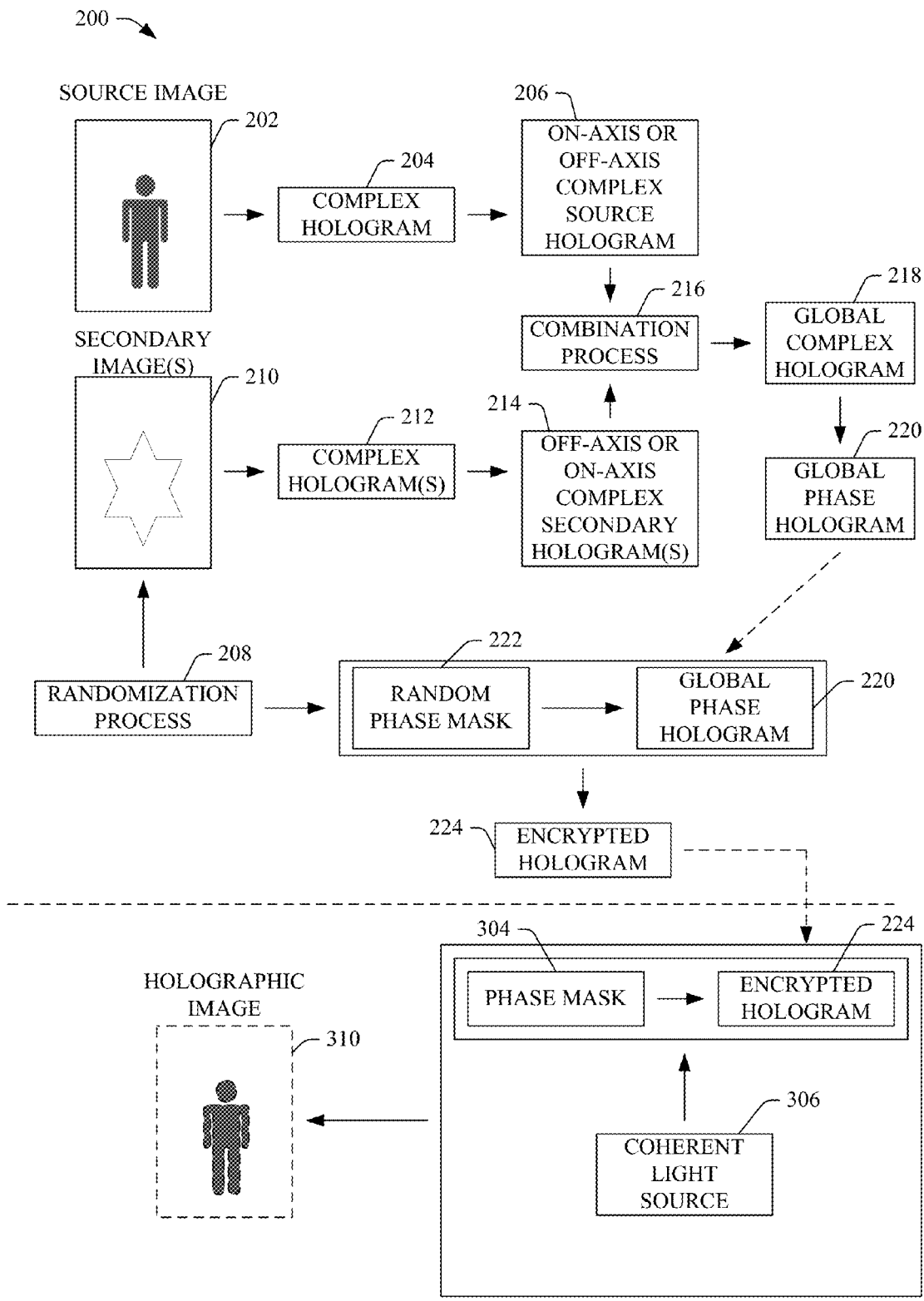
FIG. 2 depicts a block diagram of an example cryptographic flow using a single random phase encryption (SRPE) process, in accordance with various aspects and embodiments of the disclosed subject matter.

Referring briefly to FIG. 2 (along with FIG. 1), FIG. 2 depicts a block diagram of an example cryptographic flow 200 using the SRPE process, in accordance with various aspects and embodiments of the disclosed subject matter. The holographic cryptographic component 102 can generate or receive a set of multi-dimensional source images, comprising one or more multi-dimensional source images, including multi-dimensional source image 202, that can represent a multi-dimensional (e.g., 3-D or 2-D) real or synthetic object scene from one or more viewing perspectives (e.g., one or more angles in relation to the 3-D object scene). In some implementations, the holographic cryptographic component 102 can be part of or associated with (e.g., communicatively connected to) an encoder component (not shown) that can encode and/or encrypt data, including image data. In the first stage of the SRPE process, the holographic cryptographic component 102 can generate a set of complex holograms (e.g., full-parallax 3-D complex Fresnel holograms), comprising one or more complex holograms, including complex hologram 204, based at least in part on (e.g., corresponding to and representing) the set of multi-dimensional source images, using a desired complex hologram generation process. The holographic cryptographic component 102 can generate the set of complex holograms at video rate (e.g., at least 30 frames per second) or faster in real time or near real time.

For each source image 202 of a set of source images of an object scene, wherein the source image 202 can be a planar image or 3-D image, the holographic cryptographic component 102 can generate a complex hologram 204 that can represent the source image 202, which can be the source image 202 to be encrypted, using a desired complex hologram generation technique or algorithm. The holographic cryptographic component 102 can convert the complex hologram 204 representing the source image 202 into an off-axis complex hologram based at least in part on angles of incidence $\theta_{1;x}$ (along the x direction) and $\theta_{1;y}$ (along the y direction), or can maintain the complex hologram 204 as an on-axis or in-line hologram. That is, if $\theta_{1;x}=0$ degrees and $\theta_{1;y}=0$ degrees, the complex hologram 204 can be equivalent to an on-axis or in-line hologram. For ease of representation, the pair of angles can be encapsulated with the expression $(\theta_{1;x},\theta_{1;y})$. When the off-axis (or on-axis) complex hologram 206 of the source image 202 is illuminated with a plane wave, the source image 202 can be reconstructed on the focused plane orientated at angles $\theta_{1;x}$ and $\theta_{1;y}$ along the x and y directions, respectively, from the normal of the hologram plane. The off-axis (or on-axis) complex hologram 206 that is generated from the source image 202 also can be referred to as the source hologram 206 or source complex hologram 206.

With regard to generation of the complex hologram 204 based at least in part on the source image 202, for ease of explanation, it can be assumed that the source image 202 is a 2-D planar image I(x,y) that can be parallel to the hologram 204, where X is the horizontal discrete co-ordinate axis, and y is the vertical discrete co-ordinate axis. The holographic cryptographic component 102 can convert the source image 202 into a complex Fresnel hologram $H_1(u,v)$ 204, based at least in part on the source image 202, for example, as given by Equation (1) as follows:

$$H_1(u, v) = \sum_{x=0}^{X-1} \sum_{y=0}^{Y-1} I(x, y) \exp\left[\frac{i2\pi}{\lambda} r_{x;y;u;v}\right], \quad (1)$$

wherein $\lambda$ is the wavelength of the optical beam, $r_{x;y;u;v}$ is the distance from a point at (x,y) on the global image, to a point (u,v) on the hologram, u is the horizontal discrete co-ordinate axis of the hologram plane, v is the vertical discrete co-ordinate axis of the hologram plane, and X and Y can be the number of rows and columns of the hologram, respectively, which can be assumed to be the same as (e.g., can correspond to) the source image (e.g., the source image can be assumed to have X rows and Y columns) With the axial distance between the global image and the hologram 204 being denoted by $z_1$, and $\delta$ being the sampling interval which can be assumed to be identical along the horizontal and the vertical directions, $r_{x;y;u;v}$ can be determined or calculated (e.g., by the holographic cryptographic component 102), for example, using Equation (2) as follows:

$$r_{x;y;u;v} = \sqrt{(x-u)^2\delta^2 + (y-v)^2\delta^2 + z_1^2}. \quad (2)$$

The holographic cryptographic component 102 can generate an off-axis (or on-axis) complex hologram 206 that can represent the source image 202 based at least in part on the complex hologram 204. For instance, the holographic cryptographic component 102 can multiply the complex hologram $H_1(u,v)$ 204 with an inclined plane wave $R_1(u,v)$ with an angle of incidence $(\theta_{1;x},\theta_{1;y})$, to generate an off-axis (or on-axis) hologram $H_1^{oa}(u,v)$ 206 that can represent (e.g., correspond to) the source image 202. It is to be appreciated and understood that, if the angle of incidence of the inclined plane wave is 0 degrees, the complex hologram 206 can be an on-axis complex hologram.

In some implementations, the holographic cryptographic component 102 can employ a stochastic hologram generation process to facilitate randomizing the generation of encrypted holograms to facilitate desirable (e.g., optimal, suitable, acceptable) encryption and security of the set of source images (e.g., 102) to make the set of phase holograms, and the set of source images (e.g., 202) from which the set of phase holograms are derived, highly resistant to attack (e.g., correlation attack, plain text attack, or other types of attack) by an unauthorized entity (e.g., attacker, unauthorized cryptanalyst). For instance, the stochastic hologram generation process employed by the holographic cryptographic component 102 can introduce one or more random images, random variables, and/or random noise into the encrypted holograms (e.g., encrypted phase holograms) to facilitate randomizing the generation of the set of encrypted holograms. By employing the stochastic hologram generation process as part of the encryption process, even for the same object (e.g., source image 202 or object within the source image 202), the holographic cryptographic component 102 can generate different phase holograms (e.g., different encrypted phase holograms) in repetitive runs of the encryption process, which can facilitate securing the data (e.g., image data) and resisting attacks on the data (e.g., resisting correlation attacks, attacks based on the family of plain text attacks, or other types of attacks on the data) by an unauthorized entity.

In the second stage of the SRPE process, the holographic cryptographic component 102 can employ a randomization process 208 (e.g., as part of the stochastic hologram generation process), wherein the holographic cryptographic component 102 can generate (e.g., randomly generate), or can select (e.g., randomly select) from a pool of visual images that can be unknown to the operator or others, at least one secondary image 210. With respect to a secondary image(s) 210, the holographic cryptographic component 102 can generate a complex hologram(s) 212 that can represent the secondary image(s) 210 using a desired complex hologram generation technique or algorithm. The holographic cryptographic component 102 can convert the complex hologram(s) 212 representing the secondary image(s) 210 into an off-axis complex hologram 214 (or maintain it as an on-axis complex hologram 214) based at least in part on angles of incidence $\theta_{2;x;p}$ (along the x direction) and $\theta_{2;y;p}$ (along the y direction), where $0 \leq p < P$ is the index of the secondary image 210, and $P \geq 1$ is the total number of secondary image(s), and wherein each off-axis or on-axis complex hologram 214 (which also can be referred to as a secondary hologram 214 or secondary complex hologram 214) associated with the secondary image(s) 210 can have angles of incidence that can be different from the angles of incidence of the source hologram 206 associated with the source image 202 and/or can be different from the angles of incidence of the secondary hologram(s) 214 associated with another secondary image(s). If $\theta_{2;x;p}=0$ degrees and $\theta_{2;y;p}=0$ degrees, the complex hologram 214 can be equivalent to an on-axis or in-line hologram. Each secondary image 210 can be a planar image or a 3-D image. When the off-axis or on-axis hologram 214 associated with the secondary image 210 is illuminated with a plane wave (e.g., by a holographic cryptographic component 102 or display component), the holographic cryptographic component 102 or display component can reconstruct the secondary image(s) 210 on the focused plane orientated at angles $\theta_{2;x;p}$ and $\theta_{2;y;p}$ along the x and y directions, respectively, from the normal of the hologram plane. The complex hologram 214 that can be generated based on a secondary image 210 also can be known or referred to as the secondary hologram 214. The same can apply if there is more than one secondary image 210, in which case there can be a set of secondary images, and a corresponding set of holograms (e.g., 212) that can be converted into a corresponding set of off-axis (or on-axis) secondary complex holograms (e.g., 214). For ease of representation, the pair of angles can be encapsulated with the expression $(\theta_{2;x;p},\theta_{2;y;p})$. The holographic cryptographic component 102 can respectively generate the complex hologram 206 associated with the source image 202 and the secondary complex hologram(s) 214 associated with the secondary image(s) 210 to have the angular separation between $(\theta_{1;x},\theta_{1;y})$ of the source complex hologram 206 and the orientation(s) of the secondary complex hologram(s) $(\theta_{2;y;p},\theta_{2;x;p})$ be sufficiently large enough so that, during decoding of the encrypted hologram, the respective source image and secondary images can be formed at non-overlapping areas on the focused plane, and the reconstructed source image can be observed visually at its original position without any geometrical changes.

For ease of explanation, it can be assumed that a secondary image 210 is a 2-D planar image $I_{2;p}(x,y)$ that can be parallel to, and at an axial distance $z_2$ from, the hologram. The term 0≤p<P can be the index of the secondary image 210, and P can be the number of secondary images. Following a similar procedure as in the first stage of the SRPE process, the holographic cryptographic component 102 can generate an off-axis (or on-axis) hologram $H_{2;p}^{oa}(u,v)$ 214 for the $p^{th}$ secondary image (e.g., 210) with the angles of incidence of the plane wave $R_{2;p}(u,v)$ at angles of incidence $(\theta_{2;x;p},\theta_{2;y;p})$.

It is to be appreciated and understood that, if the source complex hologram 206 is an on-axis complex hologram, it can be desirable for the holographic cryptographic component 102 to generate the secondary complex hologram(s) 214 as an off-axis complex hologram, and, if the source complex hologram 206 is an off-axis complex hologram having angles of incidence $\theta_{1;x}$ (along the x direction) and $\theta_{1;y}$ (along the y direction) (e.g., based on the angles of incidence of the plane wave), the holographic cryptographic component 102 can generate the secondary complex hologram(s) 214 as an on-axis complex hologram or as an off-axis complex hologram based at least in part on angles of incidence $\theta_{2;x;p}$ (along the x direction) and $\theta_{2;y;p}$ (along the y direction) (e.g., based on the angles of incidence of the plane wave), wherein the angular separation between $(\theta_{1;x}, \theta_{1;y})$ of the source complex hologram 206 and the orientation(s) of the secondary complex hologram(s) $(\theta_{2;y;p},\theta_{2;x;p})$ 214 can be sufficiently large enough so that, during decoding of the encrypted hologram, the respective source image and secondary images can be formed at non-overlapping areas on the focused plane, and the reconstructed source image can be observed visually at its original position without any geometrical changes.

In the third stage of the SRPE process, in connection with each source image 202, the holographic cryptographic component 102 can employ a combination process 216 to sum, combine, or integrate the source hologram 206 and the one or more secondary holograms 214 to generate a global hologram 218 (e.g., global complex hologram) based at least in part on the source hologram 206 and the one or more secondary holograms 214. The holographic cryptographic component 102 can convert the global complex hologram 218 into a global phase hologram 220 (e.g., a global phase-only hologram (POH), phase-specific hologram, or pure phase hologram) using a desired phase hologram generation technique for converting complex holograms to phase holograms, wherein the desired phase hologram generation technique can be, for example, a uni-direction error diffusion (UERD) technique, bi-direction error diffusion (BERD) technique, or localized error diffusion and redistribution (LERDR) technique, as more fully disclosed herein.

By employing the combination process 216, the global phase hologram (e.g., 218) generated by the holographic cryptographic component 102 can be significantly different from the source hologram (e.g., 206) and the secondary hologram(s) (e.g., 214), individually. In addition, as the secondary image(s) (e.g., 210) can be randomly generated or randomly selected from some unknown source by the holographic cryptographic component 102, even for an identical or same source image 202, the holographic cryptographic component 102 can generate a vastly different global phase hologram (e.g., 220) in each run of the encryption process, if multiple encryption processes were to be performed in connection with a particular source image 202.

In some implementations, in this third stage, the holographic cryptographic component 102 can sum, combine, or integrate the source hologram 206 and the one or more secondary holograms 214 to generate a new global complex hologram $H_3(u,v)$ 218 using (e.g., by performing a calculation using), for example, Equation (3), as follows:

$$H_3(u, v) = H_1^{oa}(u, v) + \sum_{p=0}^{P-1} H_{2;p}^{oa}(u, v). \qquad (3)$$

The holographic cryptographic component 102 can convert the global complex hologram $H_3(u,v)$ 218 into a global phase hologram $H_p(u,v)$ 220, for example, by using the UERD technique, BERD technique, or LERDR technique, as more fully disclosed herein. The holographic cryptographic component 102 can set the magnitude of all the pixels to a desired or defined constant value to facilitate generating the global phase hologram $H_p(u,v)$ 220. That is, a complex hologram (e.g., a complex amplitude hologram) is a hologram that can comprise a magnitude component or portion (e.g., an amplitude magnitude component or portion), which can have a magnitude value, and a phase component or portion, which can have a phase value. The holographic cryptographic component 102 can use the desired phase hologram generation technique to modify or remove the magnitude component or portion of the complex hologram (e.g., for each pixel, set or modify the magnitude value to a defined constant magnitude value) to facilitate generating a phase hologram (e.g., POH, phase-specific hologram, or pure phase hologram) that can have the phase component or portion, but does not have the magnitude component or portion, or has a constant magnitude component or portion.

In the fourth stage of the SRPE process, for each global phase hologram 220 representing an object scene, the holographic cryptographic component 102 can generate a random phase mask 222 (e.g., a fixed, randomly generated phase mask), and can apply, add, integrate, multiply, or otherwise associate the random phase mask 222 to, with, or by the global phase hologram 220 (e.g., to modify the global phase hologram 220) to generate an encrypted hologram 224, which also can be referred to as an SRPE hologram, wherein the encrypted hologram 224 can represent or correspond to the combination of the source image 202 and secondary image(s) 210 (e.g., can comprise the combination of the source image and secondary image(s) in encrypted form) via the combination of the source hologram 206 and the secondary hologram(s) 214 using the combination process 216. The encrypted hologram 224 can be a white noise cipher-text hologram that can be uncorrelated to the first source image 202 or the secondary image(s) 210. Also, employing the SRPE process, the holographic cryptographic component 102 is not limited to encrypting a single source image, but rather can perform the SRPE process to encrypt a plurality of source images (e.g., 202) representing an object scene (e.g., a 3-D or 2-D object scene).

In some implementations, the holographic cryptographic component 102 can generate the encrypted hologram 224 $H_{enc}(u,v)$ by multiplying the global phase hologram $H_p(u,v)$ 220 with the random phase mask 222, such as a random phase mask, $e^{i\theta_R(u,v)}$, using Equation (4) as follows:

$$H_{enc}(u,v)=H_p(u,v)e^{i\theta_R(u,v)}. \quad (4)$$

The SRPE hologram can be taken as the encrypted (ciphertext) hologram 224, with the phase mask 222, $e^{i\theta_R(u,v)}$, being the private encryption key.

By employing the stochastic hologram generation process comprising the SRPE process, the holographic cryptographic component 102 can introduce randomness (e.g., random images, random variables, and/or random noise) into the phase holograms (e.g., 220), that can ensure that an attacker (e.g., cryptanalyst) will have no knowledge as to what the source image(s) 202 is that is being encrypted, and hence, the attacker will not be able to deduce any relationship between the encrypted hologram(s) 224 (e.g., ciphertext hologram(s)) generated using the SRPE process and the source image(s) 202. This stochastic hologram generation process also can increase the difficulty in deducing the encryption key through, for example, large-scale chosen plain text attacks (e.g., through prompting the encoder with a large number of different source images, each with a small amount of incremental change from the other images, to try to locate the affected regions of the ciphertext hologram(s) and the random phase mask).

The holographic cryptographic component 102 can store the set of encrypted holograms (e.g., 212) in memory (e.g., data store) and/or can communicate the set of encrypted holograms (e.g., 212) via a desired communication link (e.g., a wireline or wireless communication link), as desired. For instance, the set of encrypted holograms (e.g., 212) can be communicated to another component (e.g., another holographic cryptographic component) at a decoding end for decryption of the set of encrypted holograms (e.g., 212) and reconstruction of the set of source images (e.g., 202) in the form of a set of holographic images, which can correspond to and represent the set of source images (e.g., 202), and can be displayed using a desired display component, as more fully disclosed herein.

Figure 3:
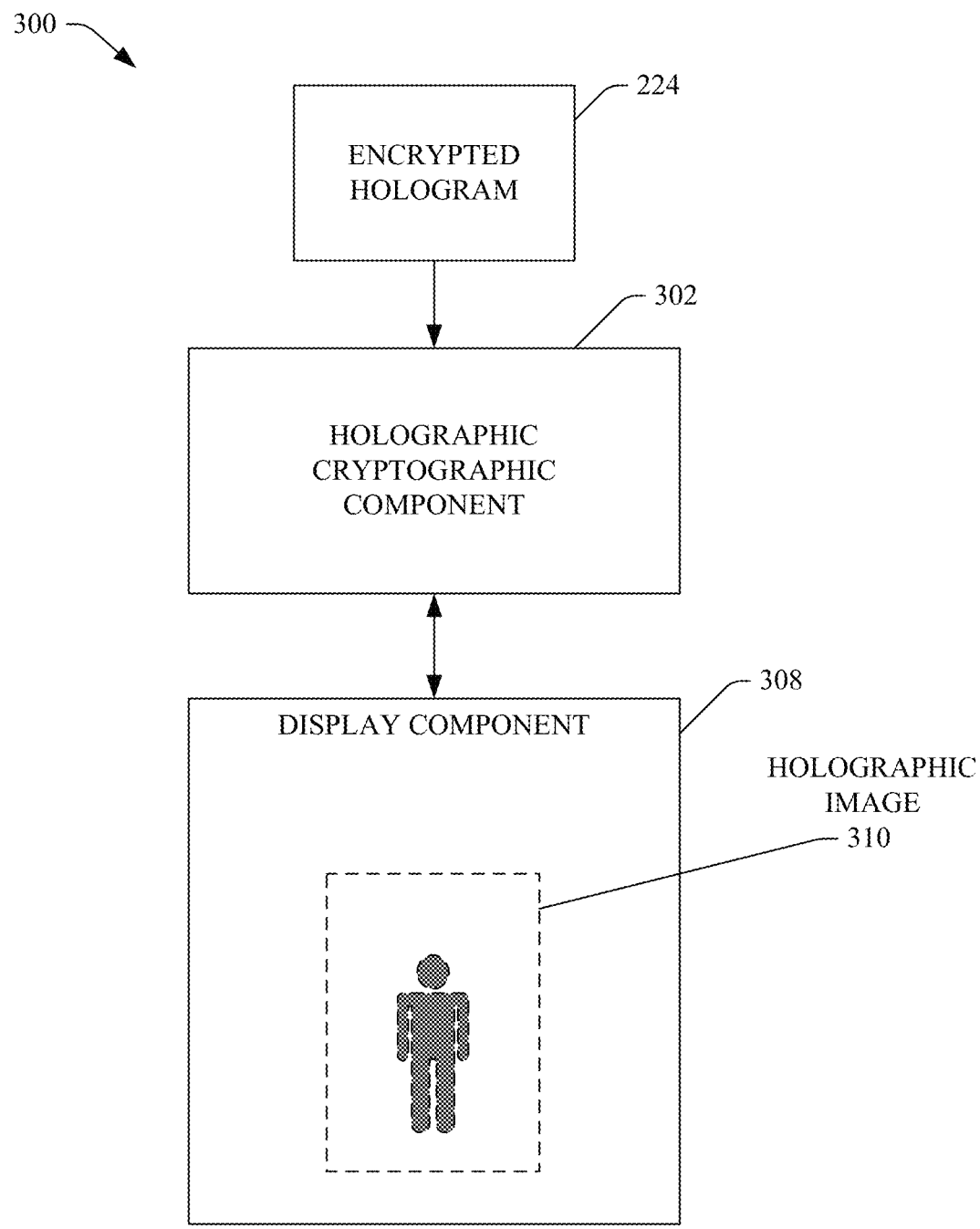
FIG. 3 illustrates a block diagram of an example system that can decode or decrypt encrypted holograms, in accordance with various aspects and implementations of the disclosed subject matter.

Referring to FIG. 3 (along with FIG. 1 and FIG. 2), FIG. 3 illustrates a block diagram of an example system 300 that can decode or decrypt encrypted holograms, in accordance with various aspects and implementations of the disclosed subject matter. The system 300 can comprise a holographic cryptographic component 302 (e.g., a holographic cryptographic component at the decoding end) that can facilitate decoding or decrypting encoded or encrypted data, such as encrypted holograms (e.g., encrypted phase holograms). In some implementations, the holographic cryptographic component 302 can be part of or associated with (e.g., communicatively connected to) a decoder component (not shown) that can decode and/or decrypt encoded and/or encrypted data, including encoded and/or encrypted image data.

To reconstruct the original set of multi-dimensional source visual images (e.g., 202), the holographic cryptographic component 302 can receive (e.g., obtain, retrieve, etc.) the set of encrypted holograms, comprising encrypted hologram 224, for example, from memory (e.g., data store) or via the communication link (e.g., from the holographic cryptographic component 102). At the decoding end, the holographic cryptographic component 302 can generate or receive a phase mask 304 (e.g., conjugate phase mask), which can inversely correspond to and/or be the conjugate of the encryption key (e.g., the random phase mask 222) associated with the set of encrypted holograms (e.g., 224). The holographic cryptographic component 302 can associate the phase mask 304 with, overlay the phase mask 304 on, and/or integrate the phase mask 304 with, the set of encrypted holograms (e.g., 224), wherein the set of encrypted holograms (e.g., 224), with the phase mask 304 overlaid thereon, can be illuminated using a coherent light source 306, for example, via the display component 308, to facilitate decrypting the set of encrypted holograms (e.g., 224) and reconstructing the respective source images (e.g., 202) and respective secondary images (e.g., 210) (e.g., reconstructing a global image comprising the source image and the secondary image(s)), wherein the respective source images can be reconstructed as a set of holographic images (e.g., full-parallax 3-D Fresnel holographic images), comprising holographic image 310, that can represent or correspond to (e.g., at least can be substantially the same as) the original set of source images (e.g., 202).

In some implementations, the holographic cryptographic component 302 can perform a decryption process to decrypt the encrypted holograms 224, in accordance with Equation (5), as follows:

$$H_{enc}(u,v)e^{-i\theta_R(u,v)}=H_p(u,v)e^{i\theta_R(u,v)}e^{-i\theta_R(u,v)}=H_p(u,v), \quad (5)$$

wherein $e^{-i\theta_R(u,v)}$ can be the phase mask 304 (e.g., conjugate phase mask).

When decrypting an encrypted hologram 224, the holographic cryptographic component 302 can reconstruct the source image and the secondary image(s) at the focused plane along orientations $(\theta_{1,x},\theta_{1,y})$, with respect to the source image, and $(\theta_{2,y;p},\theta_{2,x;p})$, with respect to the secondary image(s), wherein ($0 \leq p < P$). During the encryption process performed by the holographic cryptographic component 102 at the encoder end, the angular separation between $(\theta_{1,x},\theta_{1,y})$ of the source hologram 206 and the orientation(s) of the secondary holograms $(\theta_{2,y;p},\theta_{2,x;p})$ 214 were sufficiently large enough such that the respective source image and secondary images(s) can be formed at non-overlapping areas on the focused plane. As a result, at the decoder end, the reconstructed source image (e.g., holographic image 310) generated by the holographic cryptographic component 302 and display component 308 can be observed visually at its original position without any geometrical changes (e.g., without any interference from the reconstructed secondary image(s)). As desired, the holographic cryptographic component 302 or display component 308 can discard the secondary images, and the display component 308 can display the set of holographic images (e.g., 310) that can represent and correspond to the original set of source images (e.g., 202) (e.g., the holographic images 310 can look at least substantially the same as or similar to the original source images 202, in holographic form (e.g., 3-D holographic form)).

The set of holographic images (e.g., 310) can be displayed on the display component 308 for viewing by a user, wherein the user can view the set of holographic images (e.g., 310) from different viewing perspectives. In some implementations, the set of holographic images (e.g., 310) can be full-parallax 3-D Fresnel holographic images. The set of holographic images (e.g., 310) can comprise full parallax information and depth information, wherein the full parallax information can comprise vertical parallax information and horizontal parallax information obtained, captured, or derived from the original object scene (e.g., by the holographic cryptographic component 102). The set of reconstructed images (e.g., the set of holographic images (e.g., 310)) can be the same or substantially the same as the set of source images (e.g., 202), as the set of reconstructed images can have relatively good visual quality and fidelity relative to the original set of source images (e.g., 202).

The original set of source images (e.g., 202) is only reconstructed properly if the correct phase mask 304 is used (e.g., if the phase mask, which can inversely correspond to and/or be the conjugate of the random phase mask used to encrypt the hologram(s) at the encryption end of the process, is used). In some implementations, the decryption process (e.g., corresponding to the SRPE process) employed by the holographic cryptographic component 302 at the decoding end can be performed or realized optically or numerically by the holographic cryptographic component 302, for example, using a computer, GPU, and/or FPGA.

Another feature of the disclosed subject matter is that, if the holographic cryptographic component 102 at the encoding end applies the holographic encryption process (e.g., SRPE process) repetitively to the same source image, the holographic cryptographic component 102 can generate a different encrypted hologram corresponding to that source image for each run (e.g., for each time the holographic encryption process is performed). This can facilitate better securing the encrypted content from attack via correlation attacks or attacks based on the family of plain text attacks.

In some embodiments, the holographic cryptographic component 102, the holographic cryptographic component 302, the display component 308, and/or other components of the system 100 or system 300 can be part of a multiple-view aerial holographic projection system (MVAHPS) that can generate and display a 3-D holographic image(s) of a 3-D real or synthetic, static or animated, object scene (e.g., associated with one or more source images) viewable from multiple perspectives (e.g., multiple angles in relation to the 3-D object scene), wherein the 3-D holographic image(s) can be viewed, for example, as a 3-D image(s) floating in mid-air in a desired display area (e.g., 3-D chamber) associated with the display component 308. The holographic cryptographic component 102, the holographic cryptographic component 302, and display component 308 (e.g., a spatial light modulator (SLM) or a liquid crystal on silicon (LCoS) display device, which can be a phase-only or phase-specific display device) can facilitate generating and displaying holograms (e.g., decrypted phase holograms) at video rate in real time or near real time (e.g., facilitate generating complex holograms, converting the complex holograms to, and encrypting, phase holograms, decrypting encrypted phase holograms, generating and displaying, for example, 2048×2048-pixel holographic images (or larger-sized holograms), each of which can represent 4 million object points (or more), at approximately 40 frames per second or faster, in real time or near real time).

The systems, devices, methods, processes, techniques, etc., of the disclosed subject matter can have a number of other advantages and features over conventional systems, methods, devices, methods, processes, and techniques. For instance, one advantage can be that the disclosed subject matter can comprise encryption and decryption processes that can be less complicated than conventional encryption and decryption processes. Another advantage can be that the disclosed subject matter can comprise a decoder component, comprising a holographic cryptographic component (e.g., 302), that can be realized with less complex optical setups than conventional decoders, and can be more computationally efficient, for example, if realized numerically, than conventional decoders. Still another advantage can be that the disclosed subject matter can comprise the desirable attack resistant properties disclosed herein and, thus, can be more highly resistant to various different kinds of attacks on the encrypted images (e.g., encrypted video or holographic images), including correlation attacks and attacks based on the family of plain text attacks, as compared to conventional encryption processes, such as the HDRP cryptographic process or other types of DRPE cryptographic processes. Yet another advantage can be that the disclosed subject matter can generate images (e.g., reconstructed images) that can have more favorable reconstructed image quality than the reconstructed images obtained using conventional processes, such as the HDRP cryptographic process or other types of DRPE cryptographic processes. Still another advantage can be that the disclosed subject matter can be employed to encrypt and decrypt relatively large 2-D and 3-D source visual images more efficiently than conventional cryptographic processes. Yet another advantage can be that the disclosed subject matter does not have to modify a source image by, for example, scaling the source image to a smaller size as part of the encryption process.

These and other aspects of the SRPE process are further disclosed herein, with further regard to FIGS. 1, 2, and 3. With further regard to the third stage of the multi-stage SRPE process, for each source image 202 of an object scene, after the holographic cryptographic component 102 has generated a global complex hologram 218 using the combination process 216, the holographic cryptographic component 102 can convert the global complex hologram 218, $H_3(u,v)$, into a global phase hologram 220, $H_p(u,v)$ (e.g., a global POH, phase-specific hologram, or pure phase hologram), that can represent the combination of the source image (e.g., 202) and secondary image(s) (e.g., 210) in holographic form, based at least in part on the source image (e.g., 202) using a desired phase hologram generation technique, such as, for example, the UERD technique, BERD technique, or LERDR technique.

For exemplary purposes, the conversion of the complex hologram to a phase hologram will be further described using the BERD process. The holographic cryptographic component 102 also can use, for example, the LERDR process, as described in application Ser. No. 14/305,494, filed on Jun. 16, 2014, and entitled "CONVERSION OF COMPLEX HOLOGRAMS TO PHASE HOLOGRAMS," the entirety of which is incorporated herein by reference, or the UERD process, as described in application Ser. No. 14/029,144, filed on Sep. 17, 2013, and entitled "CONVERTING COMPLEX HOLOGRAMS TO PHASE HOLOGRAMS," the entirety of which is incorporated herein by reference.

In accordance with the BERD process, the holographic cryptographic component 102 can process the complex hologram (e.g., 204) associated with the source image (e.g., 202) from the top to the bottom row. In the odd rows, the holographic cryptographic component 102 can scan the pixels of the hologram in a left-to-right direction, and in the even rows, the holographic cryptographic component 102 can scan the pixels of the hologram in a right-to-left direction. The holographic cryptographic component 102 can set the magnitude of each visited pixel (e.g., scanned pixel) to a defined value, such as unity (which can be transparent), while maintaining the phase value of the phase component of the hologram intact, for example, in accordance with Equation (6), as follows:

$$|H_p(u_j,v_j)|=1, \text{ and } \arg(H_p(u_j,v_j))=\arg(H_3(u_j,v_j)), \quad (6)$$

wherein $(u_j,v_j)$ are the co-ordinates of the currently visited pixel. The modification, removing, or dropping of the magnitude of the hologram pixel can result in an error $E(u_j,v_j)$, that can be determined using, for example, Equation (7), as follows:

$$E(u_j,v_j)=H_3(u_j,v_j)-H_p(u_j,v_j). \quad (7)$$

If this error is not accounted for, such error can negatively impact the quality of the phase hologram (e.g., 206). In accordance with the BERD process, for visited pixels, the holographic cryptographic component 102 can reduce or minimize the effect of the error associated with a visited pixel, by diffusing the error to a subset of neighborhood pixels (e.g., neighbor pixels) associated with (e.g., in proximity to) the visited pixel. To facilitate diffusing the error to the neighborhood pixels in proximity to a current visited pixel, the hologram cryptographic component 102 can facilitate updating the neighborhood members in proximity to the current visited pixel, based at least in part on the error of the current visited pixel and respective weighting values (e.g., respective constant coefficients) for respective neighborhood members that can be based at least in part on their proximity to the current visited pixel.

For example, for the pixels being visited in the even rows, the hologram cryptographic component 102 can apply or perform the error diffusion process in a first direction (e.g., a left-to-right direction) and can facilitate diffusing or compensating for the errors associated with the pixels on the odd rows of the complex hologram (e.g., 204) to the respective neighboring pixels (e.g., neighboring pixels that have not been visited or scanned yet by the hologram cryptographic component 102), in accordance with (e.g., by applying or performing calculations according to) Equations (8), (9), (10), and (11) below. For the pixels being visited in the even rows, the hologram cryptographic component 102 can apply or perform the error diffusion process in the opposite direction (e.g., a right-to-left direction) from that of the odd rows and can facilitate diffusing or compensating for the errors associated with the pixels on the even rows by, for example, in accordance with Equations (12), (13), (14), and (15) below.

$$H_3(u_j,v_j+1) \leftarrow H_3(u_j,v_j+1)+w_1 E(u_j,v_j), \quad (8)$$

$$H_3(u_j+1,v_j-1) \leftarrow H_3(u_j+1,v_j-1)+w_2 E(u_j,v_j), \quad (9)$$

$$H_3(u_j+1,v_j) \leftarrow H_3(u_j+1,v_j)+w_3 E(u_j,v_j), \quad (10)$$

$$H_3(u_j+1,v_j+1) \leftarrow H_3(u_j+1,v_j+1)+w_4 E(u_j,v_j), \quad (11)$$

$$H_3(u_j,v_j-1) \leftarrow H_3(u_j,v_j-1)+w_1 E(u_j,v_j), \quad (12)$$

$$H_3(u_j+1,v_j+1) \leftarrow H_3(u_j+1,v_j+1)+w_2 E(u_j,v_j), \quad (13)$$

$$H_3(u_j+1,v_j) \leftarrow H_3(u_j+1,v_j)+w_3 E(u_j,v_j), \text{ and} \quad (14)$$

$$H_3(u_j+1,v_j-1) \leftarrow H_3(u_j+1,v_j-1)+w_4 E(u_j,v_j), \quad (15)$$

wherein the operator "←" can denote updating (e.g., by the hologram cryptographic component 102) the variable on the left hand side of the operator in the expression (e.g., equation) with the variable on the right hand side of the operator in the expression. The hologram cryptographic component 102 can set the values of the constant coefficients $w_1$, $w_2$, and $w_3$, and $w_4$ to respective defined values, such as, for example, $w_1=7/16$, $w_2=3/16$, $w_3=5/16$, and $w_4=1/16$.

For instance, with regard to the scanning and processing of pixels (e.g., converting complex values of pixels to phase-only values) of the complex hologram (e.g., 204), in accordance with the BERD process, with pixel $P_{u_j;v_j}$ being the pixel that is being processed by the hologram cryptographic component 102 and the row being $u_j$, which can be an odd row of the complex hologram, the next pixel to be scanned and processed by the hologram cryptographic component 102 can be $P_{u_j;v_j+1}$, followed by $P_{u_j;v_j+2}$, and so on, until this row $u_j$ pixels has been scanned and processed. For an even row of the complex hologram (e.g., 204), with pixel $P_{u_j+1;v_j}$ being the pixel (e.g., that is located at the right end of the row) that is being processed by the hologram cryptographic component 102 and the row being $u_{j+1}$, which can be an even row, the next pixel to be scanned and processed by the hologram cryptographic component 102 in that even row can be $P_{u_j;v_j-1}$, followed by $P_{u_j;v_j-2}$, and so on, until this row $u_{j+1}$ of pixels has been scanned and processed.

Figure 4:
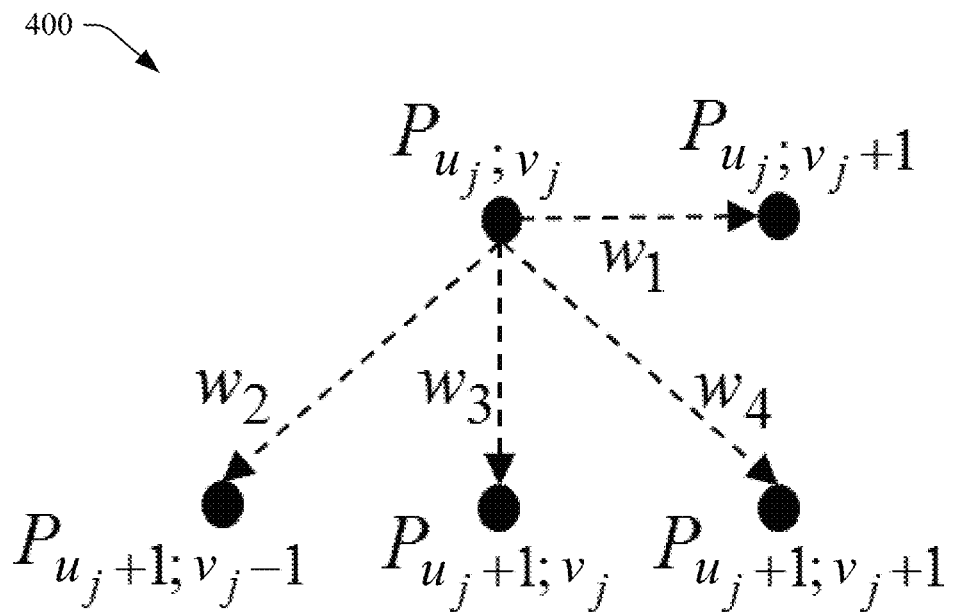
FIG. 4 presents a diagram of an example complex hologram portion that can illustrate the spatial relation between a pixel, in an odd row, and its neighbor pixels for compensation of the error via error diffusion, in accordance with various aspects and embodiments of the disclosed subject matter.

In accordance with, for example, Equations (8) through (11), FIG. 4 illustrates a diagram of an example complex hologram portion 400 that can depict the spatial relation between pixel $P_{u_j;v_j}$ in an odd row, and its neighbor pixels (e.g., neighborhood pixels) for compensation of the error via diffusion, in accordance with various aspects and embodiments of the disclosed subject matter. The complex hologram portion 400 of FIG. 4 can facilitate illustrating how the scanned pixel $P_{u_j;v_j}$ in an odd row of the complex hologram can be processed to facilitate diffusing errors to its four unvisited neighborhood pixels $P_{u_j;v_j+1}$, $P_{u_j+1;v_j-1}$, $P_{u_j+1;v_j}$, and $P_{u_j+1;v_j+1}$ via error diffusion using the BERD process. The updated value of each pixel can be visualized as the weighted sum of its four neighboring pixels.

Equivalently, Equations (8) through (11) can be rearranged into a compact recursive expression that can be given by Equation (16) as follows:

$$H_3(u_j,v_j) \leftarrow H_3(u_j,v_j)+w_1 E(u_j,v_j-1)+w_4 E(u_j-1,v_j-1)+w_3 E(u_j-1,v_j)+w_2 E(u_j-1,v_j+1) \quad (16)$$

For example, the hologram cryptographic component 102 can visit (e.g., scan) and process (e.g., convert to a phase-only value) $P_{u_j-1;v_j-1}$, and can update $P_{u_j;v_j}$ (e.g., an unvisited neighbor pixel) based at least in part on the coefficient $w_4$; can visit (e.g., scan) and process $P_{u_j-1;v_j}$, and can update $P_{u_j;v_j}$ (e.g., an unvisited neighbor pixel) based at least in part on the coefficient $w_3$; can visit (e.g., scan) and process $P_{u_j-1;v_j+1}$, and can update $P_{u_j;v_j}$ (e.g., an unvisited neighbor pixel) based at least in part on the coefficient $w_2$; and can visit (e.g., scan) and process $P_{u_j;v_j-1}$, and can update $P_{u_j;v_j}$ based at least in part on the coefficient $w_1$. The resulting updated value of $P_{u_j;v_j}$ can be the weighted sum of the updates to $P_{u_j;v_j}$ resulting from the processing of its four neighboring pixels (e.g., $P_{u_j-1;v_j-1}$, $P_{u_j-1;v_j}$, $P_{u_j-1;v_j+1}$, and $P_{u_j;v_j-1}$) and the diffusing of the respective errors of those four neighboring pixels to $P_{u_j;v_j}$.

Figure 5:
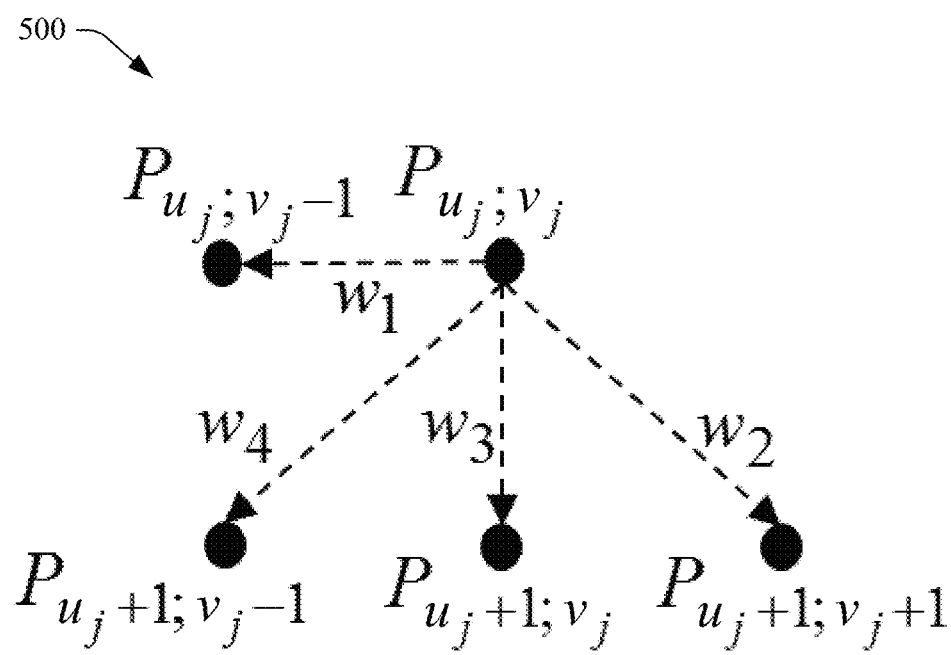
FIG. 5 presents a diagram of an example complex hologram portion that can depict the spatial relation between a pixel in an even row and its neighbor pixels for compensation of the error via error diffusion using the bi-directional error diffusion (BERD) process, in accordance with various aspects and embodiments of the disclosed subject matter.

FIG. 5 presents a diagram of an example complex hologram portion 500 that can depict the spatial relation between pixel $P_{u_j;v_j}$ in an even row and its neighbor pixels for compensation of the error via error diffusion using the BERD process, in accordance with various aspects and embodiments of the disclosed subject matter. In the example complex hologram portion 500, the row $u_j$ can be an even row of the complex hologram (e.g., 204). In accordance with the BERD process, the hologram cryptographic component 102 can proceed to scan and process the pixels of the row $u_j$ (e.g., an even row) in a right to left manner. For example, in accordance with the BERD process, the hologram cryptographic component 102 can visit (e.g., scan) and process (e.g., convert to a phase-only value) $P_{u_j;v_j}$. The hologram cryptographic component 102 also can update the complex value of $P_{u_j;v_j-1}$ (e.g., an unvisited neighbor pixel) to generate an updated complex value for that neighbor pixel to facilitate diffusing the error $E(u_j,v_j)$ associated with the pixel $P_{u_j;v_j}$, based at least in part on the error associated with processing the pixel and the applicable coefficient $w_1$, for example, in accordance with (e.g., by performing calculations or modifying values based at least in part on) Equation (12); can update the complex value of $P_{u_j+1;v_j+1}$ (e.g., an unvisited neighbor pixel) to generate an updated complex value for that neighbor pixel to facilitate diffusing the error $E(u_j,v_j)$ associated with the pixel $P_{u_j;v_j}$, based at least in part on the error associated with processing the pixel and the applicable coefficient $w_2$, for example, in accordance with Equation (13); can update the complex value of $P_{u_j+1;v_j}$ (e.g., an unvisited neighbor pixel) to generate an updated complex value for that neighbor pixel to facilitate diffusing the error $E(u_j,v_j)$ associated with the pixel $P_{u_j;v_j}$, based at least in part on the error associated with processing the pixel and the applicable coefficient $w_3$, for example, in accordance with Equation (14); and can update the complex value of $P_{u_j+1;v_j-1}$ (e.g., an unvisited neighbor pixel) to generate an updated complex value for that neighbor pixel to facilitate diffusing the error $E(u_j,v_j)$ associated with the pixel $P_{u_j;v_j}$, based at least in part on the error associated with processing the pixel and the applicable coefficient $w_4$, for example, in accordance with Equation (15).

In accordance with the disclosed BERD process, the hologram cryptographic component 102 can scan and process the pixels in the global complex hologram (e.g., 218), and can diffuse the respective error associated with the respective pixels, to generate the resulting global phase hologram (e.g., 220), based at least in part on the processing of the odd rows of the global complex hologram (e.g., 218), in accordance with Equations (8) through (11), and the processing of the even rows of the global complex hologram (e.g., 218), in accordance with Equations (12) through (15). The resulting global phase hologram (e.g., 220) can be referred to as a BERD hologram or BERD phase hologram.

It is to be appreciated and understood that, while the disclosed subject matter describes that the hologram cryptographic component 102 can scan and process pixels in the odd rows of the global complex hologram, in accordance with Equations (8) through (11), and scan and process pixels in the even rows of the global complex hologram, in accordance with Equations (12) through (15), the disclosed subject matter is not so limited. In accordance with various other implementations, the hologram cryptographic component 102 alternatively can scan and process pixels in the even rows of the global complex hologram, in accordance with Equations (8) through (11), and scan and process pixels in the odd rows of the global complex hologram, in accordance with Equations (12) through (15) (e.g., an alternate BERD process); or can perform another technique or process that can scan and process pixels of the global complex hologram to convert complex values of pixels of the global complex hologram to phase values, can facilitate diffusing error resulting from converting the complex values of pixels to phase values to their respective neighbor pixels in the global complex hologram, and can facilitate interrupting, reducing, minimizing, or counteracting correlated error that may develop during the scanning and processing of pixels in a row of the global complex hologram, in accordance with the disclosed subject matter.

With regard to the BERD process, LERDR process, and UERD process disclosed herein, the respective BERD, LERDR, and UERD processes can assume that all of the pixels in the phase-only display device are normal (e.g., each pixel will exhibit a phase shift that is proportional to the value applied to it). The hologram cryptographic component 102 also can include a means to facilitate decreasing the sensitivity of the phase hologram towards dead pixels (e.g., pixels that are opaque, or transparent with no phase shift, or a constant phase shift that is independent to the value applied to the pixel). Such dead pixels commonly can be found in many display devices due to the imperfection in manufacturing, and their positions and defective values can be evaluated beforehand. Dead pixels in a phase-only display device can be classified into three main types. For a dead pixel that is opaque, the hologram cryptographic component 102 can set or modify the values (e.g., complex and imaginary parts) of such dead pixel to zero. For a dead pixel that is transparent with no phase shift, the hologram cryptographic component 102 can set or modify the real part and imaginary part of the dead pixel's value to unity (e.g., one) and zero, respectively. For a dead pixel with a constant phase shift $\phi$, the hologram cryptographic component 102 can set or modify the values of the dead pixel's real part and imaginary part to $\cos(\phi)$ and $\sin(\phi)$, respectively.

The error that can result from a pixel value, regardless of whether it is a normal pixel or a dead pixel, can be calculated, for example, in accordance with Equation (4). For a particular pixel of a complex hologram (e.g., global complex hologram) that is being scanned, the hologram cryptographic component 102 can diffuse such error to the pixels (e.g., neighbor pixels) that are normal in its neighborhood, via the BERD process, LERDR process, or UERD process, as disclosed herein.

In addition, the hologram cryptographic component 102 can increase the weighting factor by a factor C that can be greater than 1. In some implementations, by assuming or deeming that $$\sum_{k=1}^{4} w_k = 1,$$

the hologram cryptographic component 102 (or another component) can derive the factor C from the reciprocal of the sum of weighting factors associated with the normal pixel(s).

Figure 6:
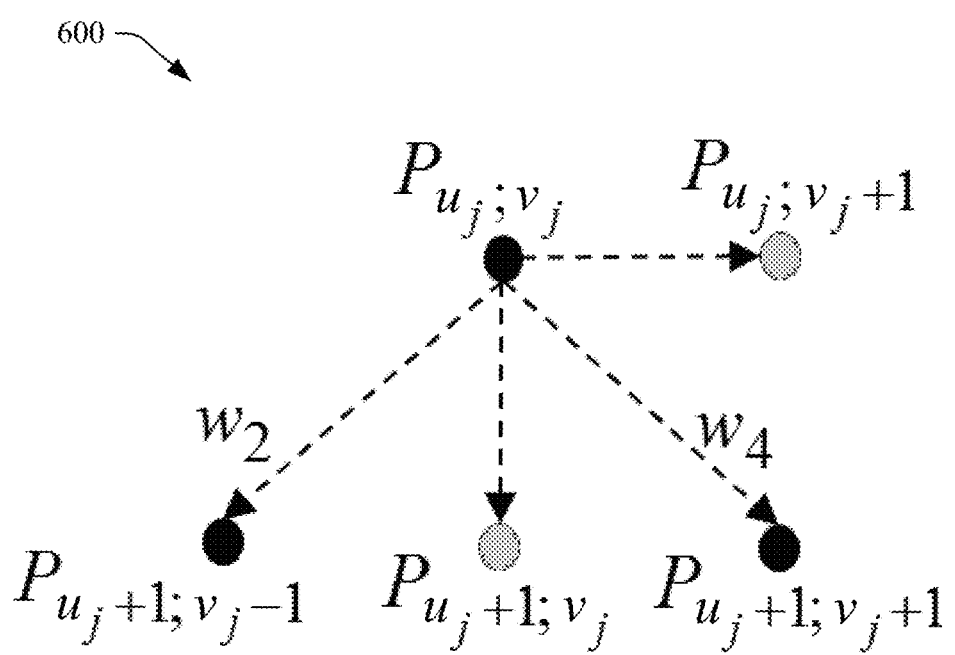
FIG. 6 illustrates a diagram of an example hologram portion comprising dead pixels to facilitate illustrating how dead pixels can be managed during processing of pixels of a complex hologram, in accordance with various aspects and embodiments of the disclosed subject matter.

FIG. 6 presents a diagram of an example complex hologram portion 600 comprising dead pixels to facilitate illustrating how the hologram cryptographic component 102 manages dead pixels during processing of pixels of a complex hologram (e.g., global complex hologram), in accordance with various aspects and embodiments of the disclosed subject matter. As depicted in the example complex hologram portion 600, pixels $P_{u_j;v_j+1}$ and $P_{u_j+1;v_j}$ (highlighted in grey tone) can be dead pixels. In such instance, the hologram cryptographic component 102 can determine that it will only diffuse the error of pixel $P_{u_j;v_j}$ to pixels $P_{u_j+1;v_j-1}$ and $P_{u_j+1;v_j+1}$. The hologram cryptographic component 102 also can determine that it will increase the coefficients $w_2$ and $w_4$ by a factor $$C = \frac{1}{(w_2 + w_4)}$$

and can the hologram cryptographic component 102 can increase the coefficients $w_2$ and $w_4$ by a factor $$C = \frac{1}{(w_2 + w_4)},$$

accordingly. If it happens that all of the four neighbor pixels associated with the scanned and converted (e.g., to phase value) pixel are dead pixels, the hologram cryptographic component 102 will not diffuse the error of the scanned and converted pixel to its neighbor pixels.

As illustrated in the disclosed subject matter, the holographic image(s) (e.g., 310), generated based at least in part on the global phase hologram(s) (e.g., 220) derived from the BERD process, LERDR process, UERD process, and/or the stochastic hologram generation process, can have a favorable visual quality (e.g., a desirably high fidelity) that can be of substantially similar visual quality as compared to the visual quality of a holographic image(s) that can be obtained using the original complex hologram(s) (e.g., 204). For instance, the holographic images can be free or at least substantially free from zero-order diffraction, twin images, or other problems associated with certain conventional methods or techniques for hologram generation and display. Further, in contrast to conventional methods or techniques, no further processing (e.g., no additional hologram generation processing, such as, for example, quantization or other type of hologram generation processing) is necessary after the hologram is generated, as the recorded 3-D holographic image can be reconstructed by illuminating the phase hologram (e.g., POH, phase-specific, or pure phase hologram), with the conjugate phase mask overlaid thereon, via a display device (e.g., phase-only SLM display device) with a coherent beam of light.

With further regard to the display component 308 of FIG. 3, the display component 308 can be electronically accessible. The holographic cryptographic component 302 can be associated with (e.g., communicatively connected to) the display component 308 and can provide (e.g., communicate) the decrypted holograms (e.g., the 3-D phase holograms) to the display component 308, for example, at video rate or a faster rate in real or near real time. In some implementations, the phase holograms can be on recorded media (e.g., 2-D media, such as film), and the holographic cryptographic component 302 can provide the phase holograms via the recorded media, as disclosed herein.

In some implementations, the display component 308 can facilitate generating, reconstructing, reproducing, or presenting holographic images (e.g., full-parallax 3-D Fresnel holographic images) that can represent or recreate the original source images, based at least in part on the phase holograms (e.g., decrypted phase holograms), and can present (e.g., display) the holographic images for viewing by one or more viewers from various visual perspectives of the original object scene (e.g., multi-dimensional (e.g., 2-D or 3-D) object scene) associated with the original source images. In certain implementations, the holographic cryptographic component 302 and the display component 308 can operate in conjunction with each other to facilitate generating, reconstructing, reproducing, or presenting the holographic images that can represent or recreate the original source images, based at least in part on the phase holograms, for presentation, by the display component 308. The display component 308 can be or can comprise a display device(s), such as an SLM display device or an LCoS display device that can be used to facilitate displaying holographic images (e.g., full-parallax 3-D holographic images) that can be reconstructed using the phase hologram. In some implementations, the display component 308 can be or can comprise a phase-only or phase-specific display device(s) (e.g., phase-only SLM display device).

In some implementations, the display component 308 can include one or more display units (e.g., one or more electronically accessible display units, wherein each pixel of a display unit(s) can be electronically accessible), wherein each display unit can be a phase-only display device, such as a phase-only SLM display device or a phase-only LCoS display device. In other implementations, the display component 308 can comprise one or more high-resolution LCDs, autostereoscopic display devices (e.g., multiple-section autostereoscopic displays (MSADs)), holographic 3-D television (TV) displays, high-resolution LCoS display devices, high-resolution SLM display devices, or other desired display devices suitable for displaying holographic images (e.g., 3-D Fresnel holographic images produced from phase holograms), to facilitate displaying (e.g., real time displaying) of holographic images.

Additionally and/or alternatively, if desired, a hologram can be produced (e.g., by a holographic cryptographic component or another component) onto a desired material (e.g., onto film using photographic techniques) so that there can be a hard copy of the hologram that can be used to reproduce the holographic images at a desired time. In some implementations, the holographic cryptographic component 102 at the encoding end can generate the digital hologram (e.g., the 3-D phase hologram) using a single static media, such as a photographic film or a printout, comprising information relating to the digital hologram. The display component 308 can display holographic images that can be reconstructed based at least in part on the digital hologram of the static media.

It is to be appreciated and understood that the holographic output (e.g., 3-D hologram and/or corresponding 3-D holographic images) can be communicated over wired or wireless communication channels to the display component 308 or other display components (e.g., remote display components, such as a 3-D TV display) to facilitate generation (e.g., reconstruction, reproduction) and display of the holographic images of the original source images) so that the holographic images can be presented to desired observers.

The system 100, system 300, and/or other systems, methods, devices, processes, techniques, etc., of the disclosed subject matter can be employed in any of a number of different applications. Such applications can include, for example, a 3-D holographic video system, desktop ornaments, attractions in theme parks, live stage or concerts, other entertainment-related applications or purposes, educational applications or purposes, a holographic studio, scientific research, other professional applications or purposes, encryption, watermarking, etc.

Figure 7:
FIG. 7 presents an example source image of "Lenna."
Figure 8:
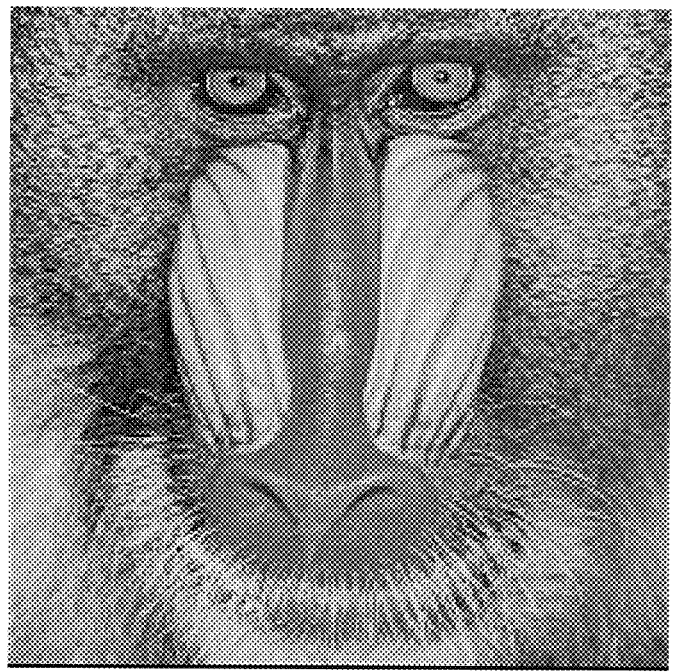
FIG. 8 presents an example first secondary image known as "Baboon."
Figure 9:
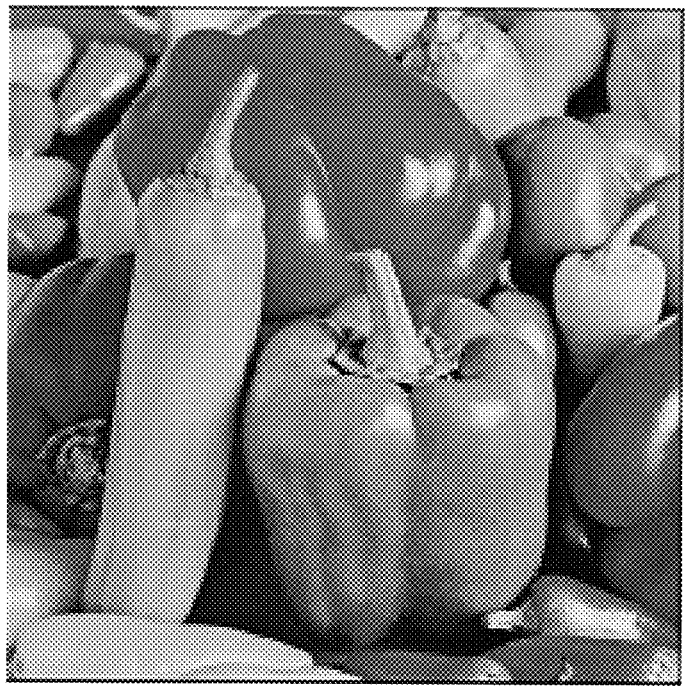
FIG. 9 presents an example second secondary image known as "Peppers."

Experimental results based on implementation of various aspects of the disclosed subject matter, including the SRPE process, are also disclosed herein. FIGS. 7, 8, and 9 present an example source image 700 of "Lenna," an example first secondary image 800 known as "Baboon," and an example second secondary image 900 known as "Peppers," respectively. The images 700, 800, and 900 are employed to facilitate evaluating the various aspects of the disclosed subject matter, including the SRPE process.

Equation (1) is applied (e.g., by the HGC 102 or another component) to generate the respective complex Fresnel holograms of the images 700, 800, and 900. Without loss of generality, the respective complex Fresnel holograms, as well as the test images 700, 800, and 900, can be assumed to have an identical size of 2048×2048 pixels, each having a square or pixel size of 8 µm×8 µm. The source image 700, first secondary image 800, and second secondary image 900 are each parallel to, and located at a distance of 0.4 m from the hologram plane.

A global complex hologram is generated (e.g., by the holographic cryptographic component 102) using the techniques described with regard to stages 2 and 3 of the SRPE process. Without loss of generality, only one secondary image is adopted here with $(\theta_{1;x},\theta_{1;y})=(0,0)$, $(\theta_{2;x;p},\theta_{2;y;p}=(0,0)$, and a wavelength $\lambda$ of 633 nm. Two different secondary images, "Baboon" image 800 and "Peppers" image 900, which are of the same size as the source image 700 and also located at 0.4 m from the hologram plane, are shown in FIGS. 8 and and 9, respectively. Note that these two secondary images are merely used for illustrating the proposed SRPE process, and other secondary images can be used as well. In the generation of the secondary complex holograms (e.g., by the holographic cryptographic component 102), the intensity of the secondary images is reduced by a factor of 2 to lower their effect on the source complex hologram. However, this is an optional process that in practice can be utilized or not utilized, as desired. It is understood that $(\theta_{1;x},\theta_{1;y})$ can be non-zero and more than one secondary image can be incorporated in the global complex hologram, as desired. In addition, both the source image 700 and the secondary image(s) (e.g., 800 and/or 900) can be non-planar and located at different distances from the hologram plane.

Figure 10:
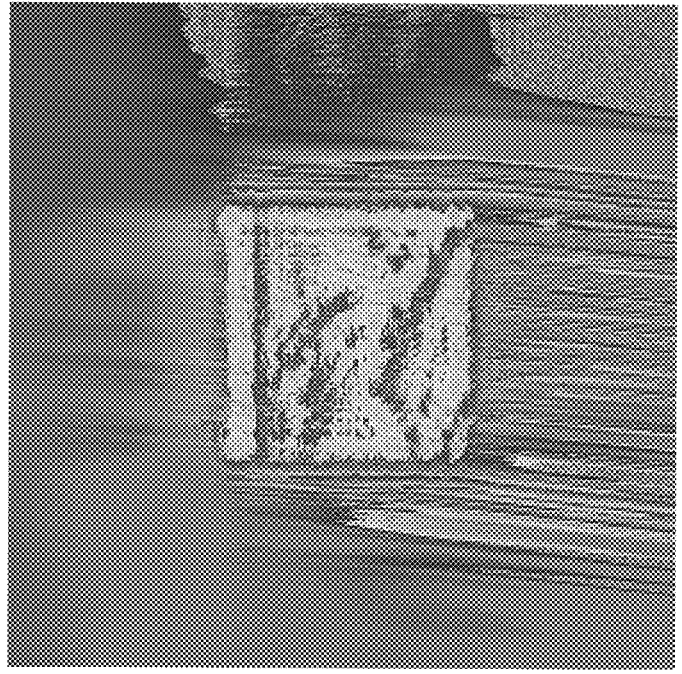
FIG. 10 presents an example phase-only hologram of "Lenna" alone, in accordance with various aspects and embodiments of the disclosed subject matter.
Figure 11:
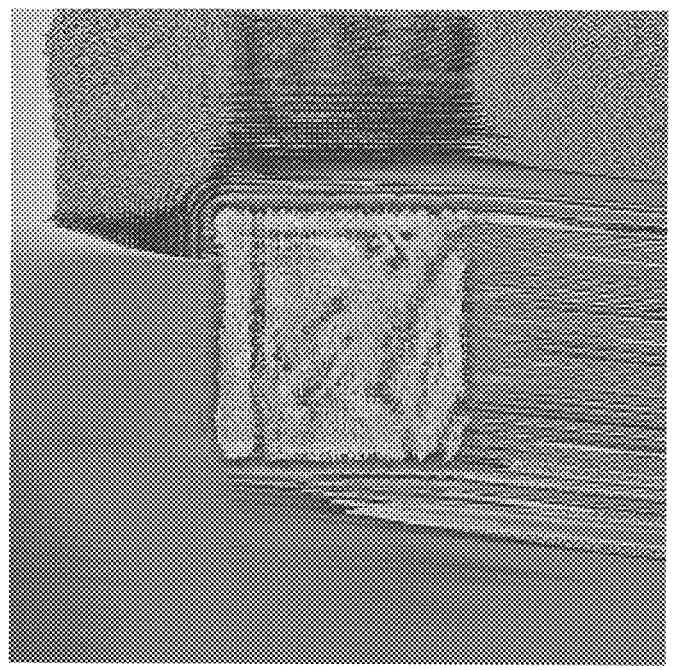
FIG. 11 presents an example global phase-only hologram formed by merging the hologram of the source image "Lenna" and the hologram of the secondary image "Baboon," in accordance with various aspects and embodiments of the disclosed subject matter.
Figure 12:
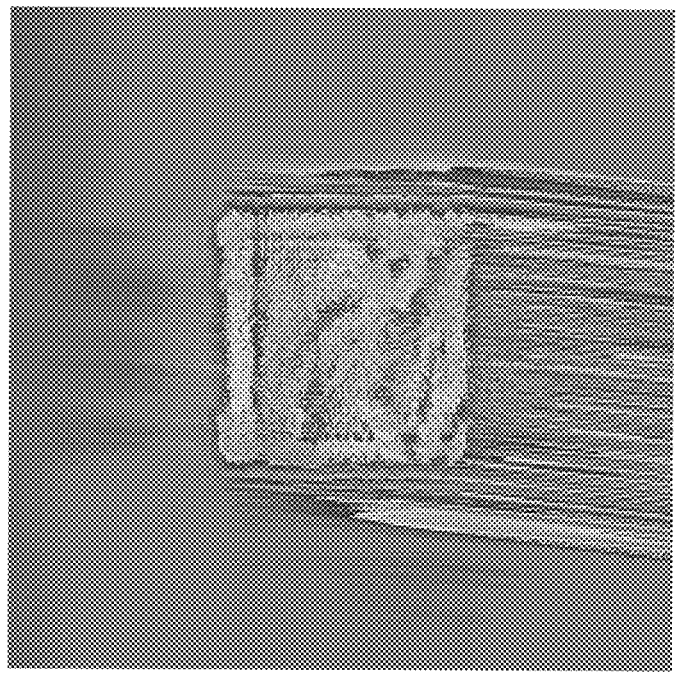
FIG. 12 presents an example global phase-only hologram formed by merging the hologram of the source image "Lenna" and the hologram of the secondary image "Peppers," in accordance with various aspects and embodiments of the disclosed subject matter.

The first, second, and third stages of the SRPE process are employed (e.g., by the holographic cryptographic component 102) to generate the global phase-only holograms based on the UERD technique, as disclosed herein. FIG. 10 presents an example phase-only hologram 1000 of "Lenna" alone, in accordance with various aspects and embodiments of the disclosed subject matter. FIG. 11 presents an example global phase-only hologram 1100 formed by merging the hologram of the source image "Lenna" and the hologram of the secondary image "Baboon," in accordance with various aspects and embodiments of the disclosed subject matter. FIG. 12 presents an example global phase-only hologram 1200 formed by merging the hologram of the source image "Lenna" and the hologram of the secondary image "Peppers," in accordance with various aspects and embodiments of the disclosed subject matter.

Figure 13:
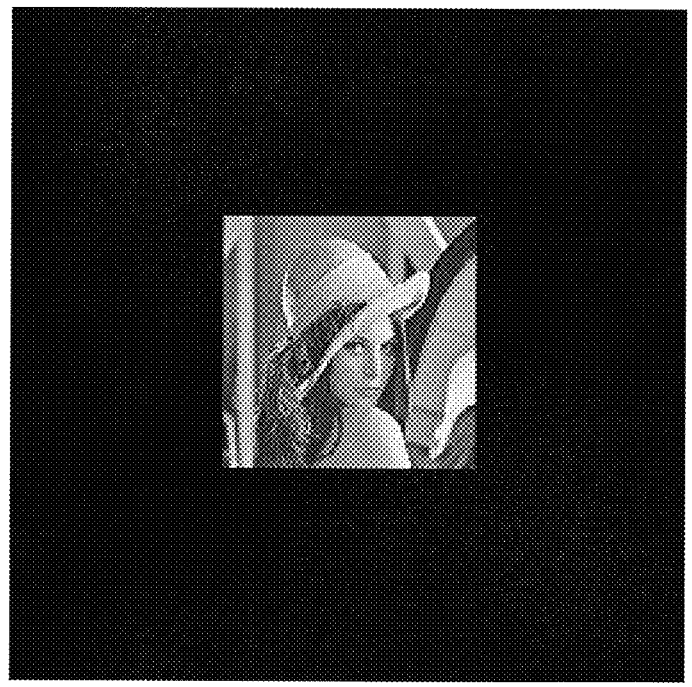
FIG. 13 presents an example numerical reconstructed image of "Lenna" alone, based on the phase-only hologram of "Lenna" alone, in accordance with various aspects and embodiments of the disclosed subject matter.
Figure 14:
FIG. 14 presents an example numerical reconstructed image derived from the global phase-only hologram that was formed by merging the hologram of the source image "Lenna" and the hologram of the secondary image "Baboon," in accordance with various aspects and embodiments of the disclosed subject matter.
Figure 15:
FIG. 15 presents an example numerical reconstructed image derived from the global phase-only hologram that was formed by merging the hologram of the source image "Lenna" and the hologram of the secondary image "Peppers," in accordance with various aspects and embodiments of the disclosed subject matter.

FIG. 13 presents an example numerical reconstructed image 1300 of "Lenna" alone, based on the phase-only hologram 1000, in accordance with various aspects and embodiments of the disclosed subject matter. FIG. 14 presents an example numerical reconstructed image 1400 derived from the global phase-only hologram 1100, which was formed by merging the hologram of the source image "Lenna" and the hologram of the secondary image "Baboon," in accordance with various aspects and embodiments of the disclosed subject matter. FIG. 15 presents an example numerical reconstructed image 1500 derived from the global phase-only hologram 1200, which was formed by merging the hologram of the source image "Lenna" and the hologram of the secondary image "Peppers," in accordance with various aspects and embodiments of the disclosed subject matter.

From images 1300, 1400, and 1500, it can be observed that the reconstructed "Lenna" images 1400 and 1500 obtained from the global phase-only holograms 1100 and 1200, respectively, are very similar to the "Lenna" image 1300 corresponding to the source hologram 1000. The secondary images, "Baboon" and "Peppers," which are formed outside the area of the source image "Lenna," do not affect the source image "Lenna" and, as desired, can be easily discarded, for example, by using a blocking mask (e.g., by the holographic cryptographic component 302 or display component 308).

Figure 16:
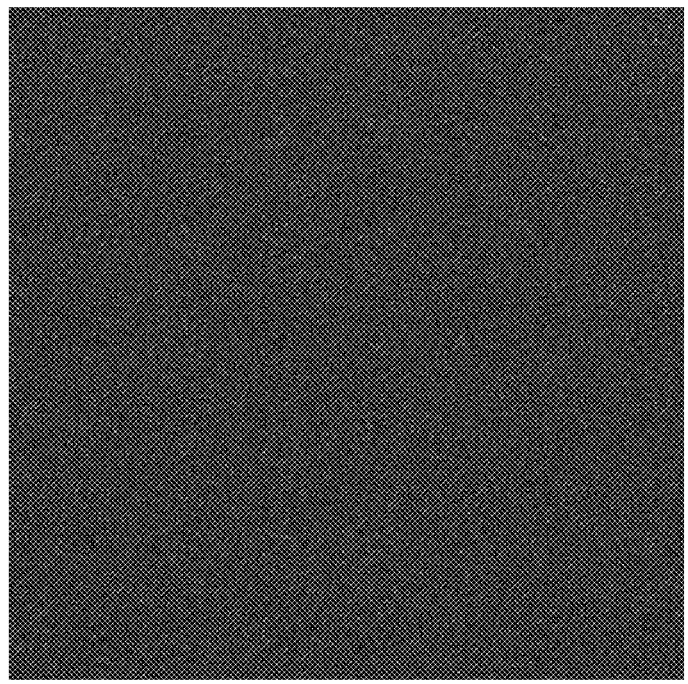
FIG. 16 presents a numerical reconstructed image derived from an SRPE hologram, which is an encoded (e.g., encrypted) version of the global phase-only hologram that was formed by merging the hologram of the source image "Lenna" and the hologram of the secondary image "Baboon," in accordance with various aspects and embodiments of the disclosed subject matter.
Figure 17:
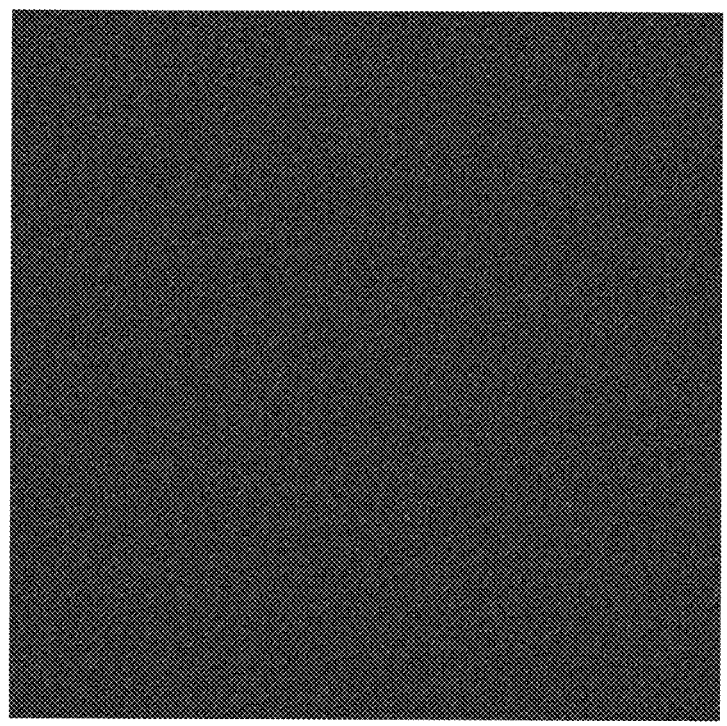
FIG. 17 presents a numerical reconstructed image derived from an SRPE hologram, which is an encoded (e.g., encrypted) version of the global phase-only hologram that was formed by merging the hologram of the source image "Lenna" and the hologram of the secondary image "Peppers," in accordance with various aspects and embodiments of the disclosed subject matter.

Using the SRPE process (e.g., by the holographic cryptographic component 102), as disclosed herein, complex holograms are generated for the original source image as well as the secondary images, the respective complex holograms are each converted into respective off-axis complex holograms, and global phase-only holograms are generated based on the off-axis complex hologram of the source image and the off-axis complex holograms of the secondary images. In the fourth stage of the SRPE process, a random phase mask is added with each global phase-only hologram (e.g., by the holographic cryptographic component 102), resulting in an SRPE hologram, which is an encrypted global phase-only hologram, with respect to the source image in connection with each secondary image. FIG. 16 presents a numerical reconstructed image 1600 derived from an SRPE hologram, which is an encoded (e.g., encrypted) version of the global phase-only hologram 1100, which was formed by merging the hologram of the source image "Lenna" and the hologram of the secondary image "Baboon," in accordance with various aspects and embodiments of the disclosed subject matter. FIG. 17 presents a numerical reconstructed image 1700 derived from an SRPE hologram, which is an encoded (e.g., encrypted) version of the global phase-only hologram 1200, which was formed by merging the hologram of the source image "Lenna" and the hologram of the secondary image "Peppers," in accordance with various aspects and embodiments of the disclosed subject matter. As is evident from FIGS. 16 and 17, the reconstructed images 1600 and 1700 are comprised of random noise and the source image "Lenna" is not recovered.

Subsequently, the correlation coefficient (CC) and the mean-square-error (MSE) were employed to evaluate the similarity between the 3 SRPE holograms, the SRPE hologram of "Lenna," the SRPE hologram of "Lenna" and "Baboon," and the SRPE hologram of "Lenna" and "Peppers." The results are listed in TABLE 1, showing the comparison between every pair of the SRPE holograms. From TABLE 1, it can be observed that for any pair of SRPE holograms that are derived from 2 different global images, the absolute of the CCs are below 0.4 (0.163 and 0.389, respectively), and the MSEs are over 7000(13289 and 14439, respectively). Both the CC and MSE factors indicate that the difference between any pair of SRPE holograms is significant in terms of both statistical measurement and pixel-to-pixel comparison, although all of the SRPE holograms are representing the same source images.

TABLE 1

Correlation/MSE between the phase-only holograms

|                | Lenna       | Lenna + Baboon | Lenna + Peppers |
|----------------|-------------|----------------|-----------------|
| Lenna          | 1/0         | −0.163/13289   | −0.389/14439    |
| Lenna + Baboon |             | 1/0            | 0.31/7400       |
| Lenna + Peppers|             |                | 1/0             |

Figure 18:
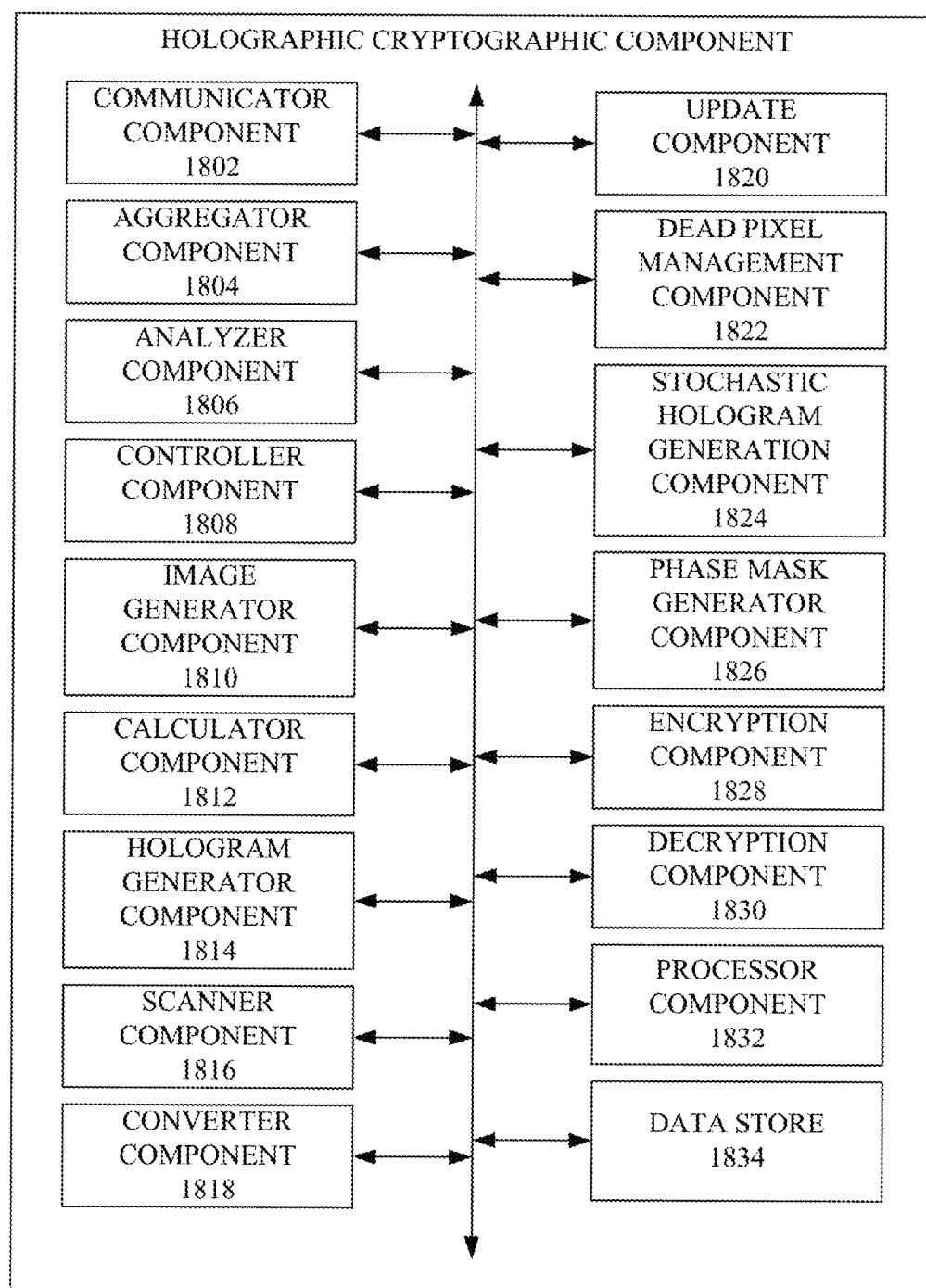
FIG. 18 illustrates a block diagram of an example holographic cryptographic component that that can facilitate performing desirable encryption and decryption of content using a holographic cryptographic process, in accordance with various aspects and embodiments of the disclosed subject matter.

FIG. 18 illustrates a block diagram of an example holographic cryptographic component 1800 that that can facilitate performing desirable encryption and decryption of content (e.g., multi-dimensional visual images) using a holographic cryptographic process, in accordance with various aspects and embodiments of the disclosed subject matter.

The holographic cryptographic component 1800 can include a communicator component 1802 that can be used to communicate (e.g., transmit, receive) information between the holographic cryptographic component 1800 and other components (e.g., display component(s), another holographic cryptographic component(s), scene capture device(s), processor component(s), user interface(s), data store(s), etc.). The information can include, for example, a visual image or set of visual images, a real or synthetic 3-D object scene, holograms or holographic images, information relating defined hologram generation criterion(s), information relation to an algorithm(s) (e.g., BERD algorithm, LERDR algorithm, UERD algorithm, stochastic hologram generation algorithm (e.g., SRPE algorithm), etc.) that can facilitate generation of holograms or holographic images, encrypted holograms, etc.

The holographic cryptographic component 1800 can comprise an aggregator component 1804 that can aggregate data received (e.g., obtained) from various entities (e.g., another holographic cryptographic component(s), scene capture device(s), display component(s), processor component(s), user interface(s), data store(s), etc.). The aggregator component 1804 can correlate respective items of data based at least in part on type of data, source of the data, time or date the data was generated or received, object point with which data is associated, row (e.g., first row, second row, third row, etc.; odd row, even row) in a hologram (e.g., complex hologram) to which a member (e.g., pixel) belongs, segment in a row to which a member belongs (e.g., first segment in first row, second segment in first row, third segment in first row, etc.), member of a hologram for which another member(s) is a neighbor member, pixel with which a transparency level is associated, visual perspective with which data is associated, a phase hologram (e.g., global phase hologram) with which an item (e.g., random phase mask, conjugate phase mask) is to be associated, etc., to facilitate processing of the data (e.g., analyzing of the data by the analyzer component 1806).

The analyzer component 1806 can analyze data to facilitate generating a complex hologram representing a source image, generating an off-axis complex hologram (or maintaining an on-axis complex hologram) based at least in part on a complex hologram, generating a global complex hologram, generating a global phase hologram (e.g., a POH, phase-specific hologram, or pure phase hologram) based at least in part on a global complex hologram, generating a random phase mask, encrypting a global phase hologram with a random phase mask, generating a conjugate phase mask, decrypting an encrypted hologram using a conjugate phase mask, generating or deriving a holographic image (e.g., a reconstructed image) that represents a source image based at least in part on the decrypted hologram, etc. The analyzer component 1806 also can analyze data to facilitate converting complex values of members (e.g., pixels) in a complex hologram (e.g., a global complex hologram) to phase values (e.g., phase-only or phase-specific values), setting coefficients and/or weightings in connection with diffusing an error associated with a member to its neighbor members, updating values of specified neighbor members of a member in the complex hologram to facilitate diffusing an error associated with the member due to the conversion to the specified neighbor members of the member, redistributing an error associated with a last member of a hologram segment to an adjacent hologram segment, identifying a dead pixel(s) in a complex hologram, setting values (e.g., values for the real part and imaginary part) for a dead pixel(s), setting coefficients and/or weightings in connection with a dead pixel(s), and/or identifying elements (e.g., object points, features, etc.) of an image or associated object scene to facilitate generating a hologram (e.g., phase hologram), etc.

The analyzer component 1806 can generate analysis results, based at least in part on the data analysis. Based at least in part on the results of this analysis, the holographic cryptographic component 1800 (e.g., one or more components of the holographic cryptographic component 1800) can generate a complex hologram representing a source image, generate an off-axis complex hologram (or maintain an on-axis complex hologram) representing a source image based on the complex hologram, generate a complex hologram(s) representing a secondary image(s), generate an off-axis complex hologram(s) (or maintain an on-axis complex hologram) representing a secondary image(s) based on the corresponding complex hologram(s), generate a global complex hologram based on the source complex hologram representing the source image and the secondary complex hologram(s) representing the secondary image(s) using a combination process, convert a global complex hologram to a global phase hologram, generate a random phase mask, encrypt the global phase hologram using a random phase mask, generate a conjugate phase mask, decrypt an encrypted hologram using the conjugate phase mask, or generate a holographic image (e.g., reconstructed image) representing a source image from a decrypted hologram. Also, based at least in part on the results of this analysis, the holographic cryptographic component 1800 can generate a global complex hologram based at least in part on a source image and a secondary image(s), convert complex values of members of a global complex hologram to phase values (e.g., in parallel), determine and/or set coefficients and/or weightings in connection with diffusing an error associated with a member to its neighbor members, update values of specified neighbor members of a member (e.g., with its complex value converted to a phase value) in the global complex hologram to facilitate diffusing an error associated with the member due to the conversion to the specified neighbor members of the member, redistribute an error associated with a last member of a hologram segment to an adjacent (e.g., a neighbor) hologram segment, generate a global phase hologram associated with a source image based at least in part on the global complex hologram, identify a dead pixel(s) in a global complex hologram, determine and/or set values (e.g., values for the real part and imaginary part) for a dead pixel(s), determine and/or set coefficients and/or weightings in connection with a dead pixel(s), and/or identify elements (e.g., object points, features, etc.) of a source image or associated object scene to facilitate generating a hologram, or perform other processes on data relating to holograms.

The holographic cryptographic component 1800 also can comprise, for example, a controller component 1808, an image generator component 1810, a calculator component 1812, a hologram generator component 1814, a scanner component 1816, a converter component 1818, an update component 1820, a dead pixel management component 1822, a stochastic hologram generation component 1824, a phase mask generator component 1826, an encryption component 1828, and/or a decryption component 1830.

The controller component 1808 can control operations relating to processing and generating encrypted holograms that can comprise an encrypted version of a source image, and decrypting encrypted holograms, in accordance with a desired holographic cryptographic process (e.g., using the SRPE process). The controller component 1808 can facilitate controlling operations being performed by various components of the holographic cryptographic component 1800, controlling data flow between various components of the holographic cryptographic component 1800, controlling data flow between the controller component 1808 and other components of the holographic cryptographic component 1800, etc.

The image generator component 1810 can facilitate generating or processing images, such as source images that can represent a real or synthetic, static or animated, object scene (e.g., 3-D or 2-D object scene). For instance, an image generator component 1810 can generate a set of source images (e.g., synthetic) of an object scene or can receive a set of source images (e.g., real or synthetic) of an object scene, wherein real source images can be captured by one or more capture components (e.g., cameras), for example. The image generator component 1810 also can facilitate generating or processing (e.g., randomly generating or processing) images, such as secondary images, that can be used by the holographic cryptographic component 1800 to facilitate randomizing the encryption process and obscuring the source image from potential attackers.

The calculator component 1812 can perform calculations on data (e.g., data with respective values), in accordance with various equations (e.g., mathematical expressions), to facilitate generating an image (e.g., a source image, a secondary image), generating a complex hologram of an image, generating an off-axis complex hologram, generating a global complex hologram, generating a global phase hologram based at least in part on a global complex hologram, converting a complex value of a member of a global complex hologram to a phase value, determining or calculating coefficients or weightings associated with diffusing an error associated with a member to its neighbor members, updating complex values of specified neighbor members of a member that has had its complex value converted to a phase value, redistributing an error associated with a last member of a hologram segment to an adjacent hologram segment, determining or calculating values for dead pixels, determining or calculating coefficients or weightings associated with dead pixels, performing a stochastic hologram generation process (e.g., an SRPE process), associating (e.g., applying or overlaying) a random phase mask with (or on) a global phase hologram, associating a conjugate phase mask with an encrypted hologram, decrypting an encrypted hologram using the conjugate phase mask, and/or performing other operations. The calculator component 1812 can facilitate performing calculations and generating calculation results using one or more equations, including the equations disclosed herein, relating to generating images, generating or processing complex holograms, generating or processing phase holograms, encrypting phase holograms, decrypting encrypted holograms, reconstructing images via generating holographic images, etc.

The hologram generator component 1814 can facilitate generating a complex hologram that can represent a source image(s) or an associated object scene at a desired rate (e.g., at video rate or a faster rate (e.g., approximately 30 frames per second or faster)), for example, using one or more of the fast hologram generation techniques, processes, or methods, such as disclosed herein. The hologram generator component 1814 also can facilitate generating a complex hologram that can represent a secondary image(s) at a desired rate (e.g., at video rate or a faster rate), for example, using one or more of the fast hologram generation techniques, processes, or methods, such as disclosed herein. The hologram generator component 1814 also can convert a complex hologram of an image to an off-axis complex hologram (or can maintain the complex hologram as an on-axis complex hologram). The hologram generator component 1814 further can generate a global complex hologram based at least in part on a source complex hologram of a source image and a secondary complex hologram(s) of a secondary image(s). The hologram generator component 1814 also can facilitate processing a global complex hologram to generate a global phase hologram that can correspond to the global complex hologram at a desired rate (e.g., at video rate or a faster rate).

The scanner component 1816 can visit, scan, analyze, or examine members (e.g., pixels) of segments of a complex hologram (e.g., global complex hologram) to facilitate converting the complex values of members to phase values to generate a corresponding phase hologram (e.g., global phase hologram). The scanner component 1816 also can facilitate determining the complex values of respective members of the complex hologram. The scanner component 1816 can scan members of a complex hologram, in accordance with, for example, a BERD process, an LERDR process, or a UERD process, as more fully disclosed herein. For example, when the BERD process is employed, the scanner component 1816 can visit, scan, analyze, or examine members of an odd row of a complex hologram in a first direction (e.g., left-to-right direction), and can visit, scan, analyze, or examine members of an even row of the complex hologram in a second direction (e.g., right-to-left direction). When the LERDR process is employed, the scanner component 1816 can visit, scan, analyze, or examine members of segments of a complex hologram in segment by segment, and row by row manner (e.g., scanning pixels in a first segment of a first row, scanning pixels in a second segment of the first row, and so on), for example, in a left to right manner (e.g., by scanning a pixel in a row, scanning a next pixel that is to the right of the pixel in the row, and so on), or alternatively, in a right to left manner (e.g., by scanning a pixel in a first segment of a first row, scanning a next pixel that is to the left of the pixel in that segment, and so on). When the UERD process is employed, the scanner component 1816 can visit, scan, analyze, or examine members of a complex hologram in a row by row manner (e.g., scanning pixels in a first row, scanning pixels in a second row, and so on), for example, in a left to right manner (e.g., by scanning a pixel in a row, scanning a next pixel that is to the right of the pixel in the row, and so on).

The converter component 1818 can convert the complex value of a member of a hologram to a phase value (e.g., a phase-only or phase-specific value). For instance, the converter component 1818 can set or modify the magnitude of each member to a desired constant value (e.g., a value of unity, so that the magnitude component of the member can be transparent), which can remove the magnitude information, for example, in accordance with Equation (6).

The update component 1820 can facilitate updating the complex values of certain (e.g., specified, not yet visited) neighbor members in a complex hologram (e.g., a global complex hologram) that are in proximity to a member that has had its complex value modified or converted to a phase value. The update component 1820 can perform the updates of the complex values of these certain neighbor members to facilitate diffusing an error, which is associated with the conversion of the complex value of the member to the phase value, to these certain neighbor members, as more fully disclosed herein (e.g., in accordance with the applicable equations disclosed herein, and the processes (e.g., BERD process, LERDR process, UERD process) disclosed herein).

The dead pixel management component 1822 can be employed to facilitate managing any dead pixels that are identified or detected in a complex hologram. The dead pixel management component 1822 can facilitate decreasing the sensitivity of a phase hologram (e.g., a global phase hologram) towards dead pixels (e.g., pixels that are opaque, or transparent with no phase shift, or a constant phase shift that is independent to the value applied to the pixel). For example, for a dead pixel that is opaque, the dead pixel management component 1822 can set or modify the values (e.g., complex and imaginary parts) of such dead pixel to zero. For a dead pixel that is transparent with no phase shift, the dead pixel management component 1822 can set or modify the real part and imaginary part of the dead pixel's value to unity (e.g., one) and zero, respectively. For a dead pixel with a constant phase shift $\phi$, the dead pixel management component 1822 can set or modify the values of the dead pixel's real part and imaginary part to $\cos(\phi)$ and $\sin(\phi)$, respectively. The dead pixel management component 1822 also can facilitate determining or modifying weighting factors or coefficient values applied during an error diffusing process to facilitate accounting for the dead pixels, as more fully disclosed herein.

The stochastic hologram generation component 1824 can operate in conjunction with the hologram generator component 1814 (and other components of the holographic cryptographic component 1800) to facilitate generating or selecting (e.g., randomly generating or selecting) a secondary image(s) to use in conjunction with encrypting a source image, generating a complex hologram that corresponds to a source image, generating a complex hologram(s) that corresponds to a secondary image(s), converting a complex hologram of a source image to an off-axis (or on-axis) complex source hologram, converting a complex hologram(s) of a secondary image(s) to an off-axis (or on-axis) complex secondary hologram(s), generating a global complex hologram based at least in part on a complex source hologram and a complex secondary hologram(s), and/or converting complex holograms (e.g., global complex holograms) to phase holograms (e.g., global phase holograms), during the hologram cryptographic process (e.g., the SRPE process). The stochastic hologram generation component 1824 can apply the stochastic hologram generation process, comprising the SRPE process, to introduce one or more random images, random variables, and/or random noise into the set of phase holograms, which can facilitate randomizing the generation of the set of phase holograms derived from the set of complex holograms to facilitate desirable encryption of the image data of the set of source images represented by (e.g., encrypted in) the set of phase holograms.

At the encryption end, the phase mask generator component 1826 can generate a random phase mask(s) that can be used as a private encryption key(s) to encrypt the set of phase holograms (e.g., the set of global phase holograms) associated with a set of source images to facilitate generating a set of encrypted holograms (e.g., encrypted random phase holograms). For instance, the phase mask generator component 1826 can generate a random phase mask based at least in part on a randomizing function and/or random number. At the decryption end, with respect to the set of encrypted holograms, the phase mask generator component 1826 can generate a phase mask, such as a conjugate phase mask, that can inversely correspond to or can be the conjugate of a random phase mask that was used to encrypt the set of phase holograms to generate the set of encrypted holograms.

The encryption component 1828 can encrypt the set of phase holograms associated with the set of source images to generate the set of encrypted holograms based at least in part on the random phase mask(s). For example, the encryption component 1828 can apply, add, integrate, multiply, or otherwise associate the random phase mask to, with, or by the set of phase holograms (e.g., the set of global phase holograms) to generate the set of encrypted holograms.

At the decryption end, the decryption component 1830 can decrypt the set of encrypted holograms associated with the set of source images (e.g., comprising encrypted versions of the source images) based at least in part on a phase mask(s) (e.g., conjugate phase mask(s) with respect to the random phase mask(s)). For instance, the decryption component 1830 can apply, integrate, overlay, multiply, or otherwise associate the phase mask(s) (e.g., conjugate phase mask(s) with respect to the random phase mask(s)) to, with, or by the set of encrypted holograms to decrypt the set of encrypted holograms.

The holographic cryptographic component 1800 also can comprise a processor component 1832 that can operate in conjunction with the other components (e.g., communicator component 1802, aggregator component 1804, analyzer component 1806, controller component 1808, and/or other components of the holographic cryptographic component 1800) to facilitate performing the various functions of the holographic cryptographic component 1800. The processor component 1832 can employ one or more processors (e.g., central processing units (CPUs), GPUs, FPGAs, etc.), microprocessors, or controllers that can process data, such as information (e.g., visual information) relating to visual images (e.g., source images) or associated object scene (e.g., 2-D or 3-D object scene), holographic data, data relating to parameters associated with the holographic cryptographic component 1800 and associated components, etc., to facilitate generating images, generating holograms (e.g., full-parallax complex 3-D Fresnel hologram, off-axis or on-axis complex hologram, global complex hologram, global phase hologram based on the global complex hologram) and corresponding holographic images representative of a source image or associated object scene, applying the stochastic hologram generation process (e.g., SRPE process), encrypting holograms using a random phase mask, and/or decrypting encrypted holograms using a conjugate phase mask with respect to a random phase mask; and can control data flow between the holographic cryptographic component 1800 and other components associated with the holographic cryptographic component 1800.

In yet another aspect, the holographic cryptographic component 1800 can contain a data store 1834 that can store data structures (e.g., user data, metadata); code structure(s) (e.g., modules, objects, classes, procedures), commands, or instructions; information relating to object points; information relating to (e.g., representative of) images (e.g., source images) or associated object scene; model data; holographic data; information relating to generating holograms, converting a complex value of a member of a complex hologram to a phase value, diffusing an error associated with a member to certain neighbor members of the member, managing dead pixels in a complex hologram, etc.; information relating to generating a phase mask (e.g., random phase mask, conjugate phase mask); information relating to encrypting holograms; information relating to decrypting encrypted holograms; parameter data; algorithms (e.g., algorithm(s) relating to fast generation of holograms at a desired rate (e.g., at video rate or faster); algorithm(s) relating to generating a complex hologram; BERD algorithm; LERDR algorithm; UERD algorithm; stochastic hologram generation process); criterion(s) relating to hologram generation; and so on. In an aspect, the processor component 1832 can be functionally coupled (e.g., through a memory bus) to the data store 1834 in order to store and retrieve information desired to operate and/or confer functionality, at least in part, to the communicator component 1802, aggregator component 1804, analyzer component 1806, controller component 1808, and/or other components of the holographic cryptographic component 1800, and/or substantially any other operational aspects of the holographic cryptographic component 1800.

It is to be appreciated and understood that the various components of the holographic cryptographic component 1800 can communicate information between each other and/or between other components associated with the holographic cryptographic component 1800 as desired to carry out operations of the holographic cryptographic component 1800. It is to be further appreciated and understood that respective components (e.g., communicator component 1802, aggregator component 1804, analyzer component 1806, controller component 1808, and/or other components) of the holographic cryptographic component 1800 each can be a stand-alone unit, can be included within the holographic cryptographic component 1800 (as depicted), can be incorporated within another component of the holographic cryptographic component 1800 or a component separate from the holographic cryptographic component 1800, and/or virtually any suitable combination thereof, as desired.

It is to be appreciated and understood that, in accordance with various other aspects and embodiments, the holographic cryptographic component 1800 or components associated therewith can include or be associated with other components (not shown for reasons of brevity), such as, for example, a modeler component (e.g., to facilitate generating model data that can be used to generate or display a hologram), adapter components (e.g., to facilitate adapting or modifying holographic images or data to facilitate desirably generating or displaying the hologram), a reference beam component (e.g., to apply a reference beam to a object scene and/or a hologram), a render component (e.g., to render or convert data, such as model data or diffraction pattern data, associated with an image (e.g., source image) or associated object scene into corresponding holographic data, which can be used to generate a hologram that is a reproduction of the image or associated object scene), a reflector component(s) (e.g., to reflect holographic images to facilitate display of the hologram), and/or display partitions (e.g., to partition a display into a desired number of partitions in order to show different views of the hologram), etc., that can be employed to facilitate generating a hologram and/or generating or displaying corresponding holographic images representing an object scene.

Figure 19:
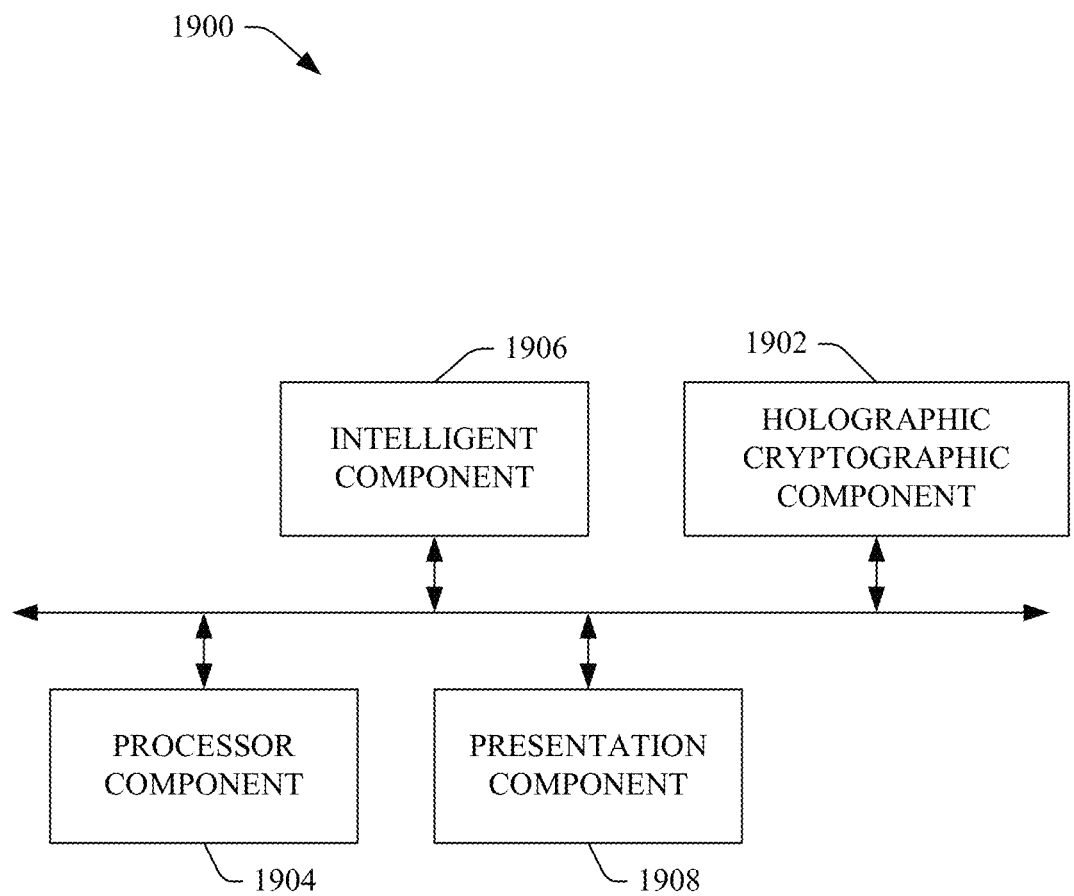
FIG. 19 depicted is a block diagram of a system that can employ intelligence to facilitate performing desirable encryption and decryption of content in accordance with a holographic cryptographic process, in accordance with various aspects and embodiments of the disclosed subject matter.

Referring to FIG. 19, depicted is a block diagram of a system 1900 that can employ intelligence to facilitate performing desirable encryption and decryption of content (e.g., multi-dimensional visual images) in accordance with a holographic cryptographic process (e.g., SRPE process), in accordance with various aspects and embodiments of the disclosed subject matter. The system 1900 can include a holographic cryptographic component 1902 that can encrypt a set of source images, via generating a set of complex holograms based at least in part on the set of source images and a set of secondary images, generating a set of phase holograms (e.g., global phase holograms) based at least in part on the set of complex holograms (e.g., global complex holograms), and using a random phase mask as the private encryption key with the set of phase holograms to generate a set of encrypted holograms, in accordance with a desired holographic cryptographic process, as more fully disclosed herein. At the decoding end, a holographic cryptographic component 1902 can decrypt the set of encrypted holograms using a conjugate phase mask. The set of decrypted holograms can be illuminated with a coherent light beam to generate a set of holographic images (e.g., reconstructed images) that can reconstruct and correspond to the set of source images, wherein the set of holographic images can be displayed for viewing. It is to be appreciated that the holographic cryptographic component 1902 can be the same or similar as respective components (e.g., respectively named components), and/or can contain the same or similar functionality as respective components, as more fully described herein.

The system 1900 can further include a processor component 1904 that can be associated with (e.g., communicatively connected to) the holographic cryptographic component 1902 and/or other components (e.g., components of system 1900) via a bus. In accordance with an embodiment of the disclosed subject matter, the processor component 1904 can be an applications processor(s) that can manage communications and run applications. For example, the processor component 1904 can be a processor that can be utilized by a computer, mobile computing device, personal data assistant (PDA), or other electronic computing device. The processor component 1904 can generate commands in order to facilitate generating source images, generating complex holograms representing the source images, converting complex holograms to off-axis complex holograms or maintaining complex holograms as on-axis complex holograms, generating global complex holograms, converting global complex holograms to global phase holograms, diffusing respective errors of respective pixels of a complex hologram to respective neighbor pixels, redistributing an error associated with last pixels of hologram segments to respective adjacent segments, applying the stochastic hologram generation process, generating a random phase mask, associating the random phase mask with phase holograms to generate encrypted holograms, generating a conjugate phase mask in connection with a random phase mask, decrypting encrypted holograms using the conjugate phase mask, generating holographic images from the decrypted holograms (e.g., via use of a coherent light beam) and/or displaying of the holographic images, modifying parameters associated with the holographic cryptographic component 1902, etc.

The system 1900 also can include an intelligent component 1906 that can be associated with (e.g., communicatively connected to) the holographic cryptographic component 1902, the processor component 1904, and/or other components associated with system 1900 to facilitate analyzing data, such as current and/or historical information, and, based at least in part on such information, can make an inference(s) and/or a determination(s) regarding, for example, generating a complex hologram representing a source image, converting a complex hologram to an off-axis (or on-axis) complex hologram, generating a global complex hologram, converting a global complex hologram to a global phase hologram, converting a value of a pixel from a complex value to a phase value (e.g., a phase-only or phase-specific value), diffusing an error associated with converting a pixel to a neighbor pixel(s), redistributing an error associated with last pixels of hologram segments to respective adjacent segments, determining a conversion process (e.g., LERDR process, BERD process, UERD process, etc.) to perform on a complex hologram to convert it to a phase hologram, managing the diffusion of an error associated with converting a value of a pixel from a complex value to a phase value to neighbor pixels when a neighbor pixel(s) is a dead pixel(s), applying the stochastic hologram generation process, determining a secondary image to use to facilitate creating a global phase hologram, determining a number of secondary images to use to facilitate creating a global phase hologram, generating a random phase mask, associating the random phase mask with a phase hologram to generate an encrypted hologram, generating a conjugate phase mask in connection with a random phase mask, decrypting an encrypted hologram using the conjugate phase mask, generating a holographic image from the decrypted hologram, determining and/or setting of parameters associated with the holographic cryptographic component 802 and associated components, etc.

For example, based in part on current and/or historical evidence, the intelligent component 1906 can infer or determine a type of hologram conversion process (e.g., LERDR process, BERD process, UERD process, etc.) to employ to convert a global complex hologram associated with a source image to a global phase hologram, an operation to perform as part of the stochastic hologram generation process (e.g., the SRPE process), a random phase mask to be generated for use in encrypting a global phase hologram of the global image, an operation to perform in connection with managing the diffusion of an error that is associated with converting a complex value of a pixel to a phase value to neighbor pixels when a neighbor pixel(s) is a dead pixel(s), a conjugate phase mask to be generated to decrypt an encrypted hologram to facilitate reconstructing the source image, respective parameter values of one or more parameters to be used with regard to the performing of operations by the holographic cryptographic component 1902, etc.

In an aspect, the intelligent component 1906 can communicate information related to the inferences and/or determinations to the holographic cryptographic component 1902. Based at least in part on the inference(s) or determination(s) made by the intelligent component 1906, the holographic cryptographic component 1902 can take (e.g., automatically or dynamically take) one or more actions to facilitate encrypting a source image or decrypting an encrypted hologram containing an encrypted version of the source image. For instance, the holographic cryptographic component 1902 can determine or identify a type of hologram conversion process to employ to convert a complex hologram of the source image to a phase hologram, an operation to perform as part of the stochastic hologram generation process, a random phase mask to be generated for use in encrypting a phase hologram of the source image to generate an encrypted hologram (e.g., an encrypted random phase hologram), an operation to perform in connection with managing the diffusion of an error that is associated with converting a complex value of a pixel to a phase value to neighbor pixels when a neighbor pixel(s) is a dead pixel(s), a conjugate phase mask to be generated to decrypt an encrypted hologram to facilitate reconstructing the source image, respective parameter values of one or more parameters to be used with regard to the performing of operations by the holographic cryptographic component 1902, as disclosed herein.

It is to be understood that the intelligent component 1906 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 1900 also can include a presentation component 1908, which can be connected with the processor component 1904. The presentation component 1908 can provide various types of user interfaces to facilitate interaction between a user and any component coupled to the processor component 1904. As depicted, the presentation component 808 is a separate entity that can be utilized with the processor component 1904 and associated components. However, it is to be appreciated that the presentation component 1908 and/or similar view components can be incorporated into the processor component 1904 and/or can be a stand-alone unit. The presentation component 1908 can provide one or more graphical user interfaces (GUIs) (e.g., touchscreen GUI), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the processor component 1904.

The user can also interact with the regions to select and provide information via various devices such as a mouse, a roller ball, a keypad, a keyboard, a touchscreen, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

In accordance with one embodiment of the disclosed subject matter, the holographic cryptographic component 1902 and/or other components, can be situated or implemented on a single integrated-circuit chip. In accordance with another embodiment, the holographic cryptographic component 1902, and/or other components, can be implemented on an application-specific integrated-circuit (ASIC) chip. In yet another embodiment, the holographic cryptographic component 1902 and/or other components, can be situated or implemented on multiple dies or chips.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 20:
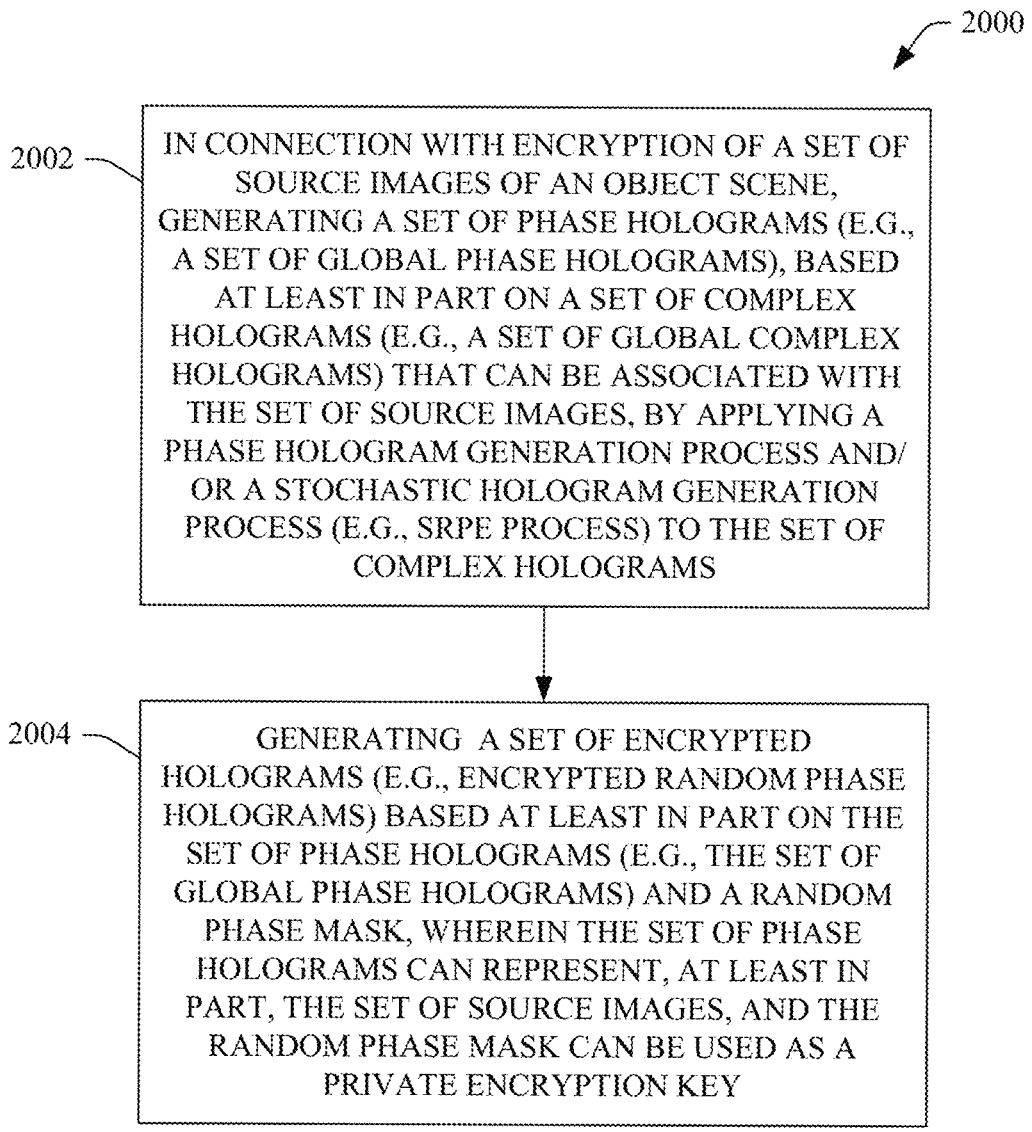
FIG. 20 illustrates a flow diagram of an example method that can facilitate encrypting content using a holographic cryptographic process, in accordance with various aspects and embodiments of the disclosed subject matter.
Figure 21:
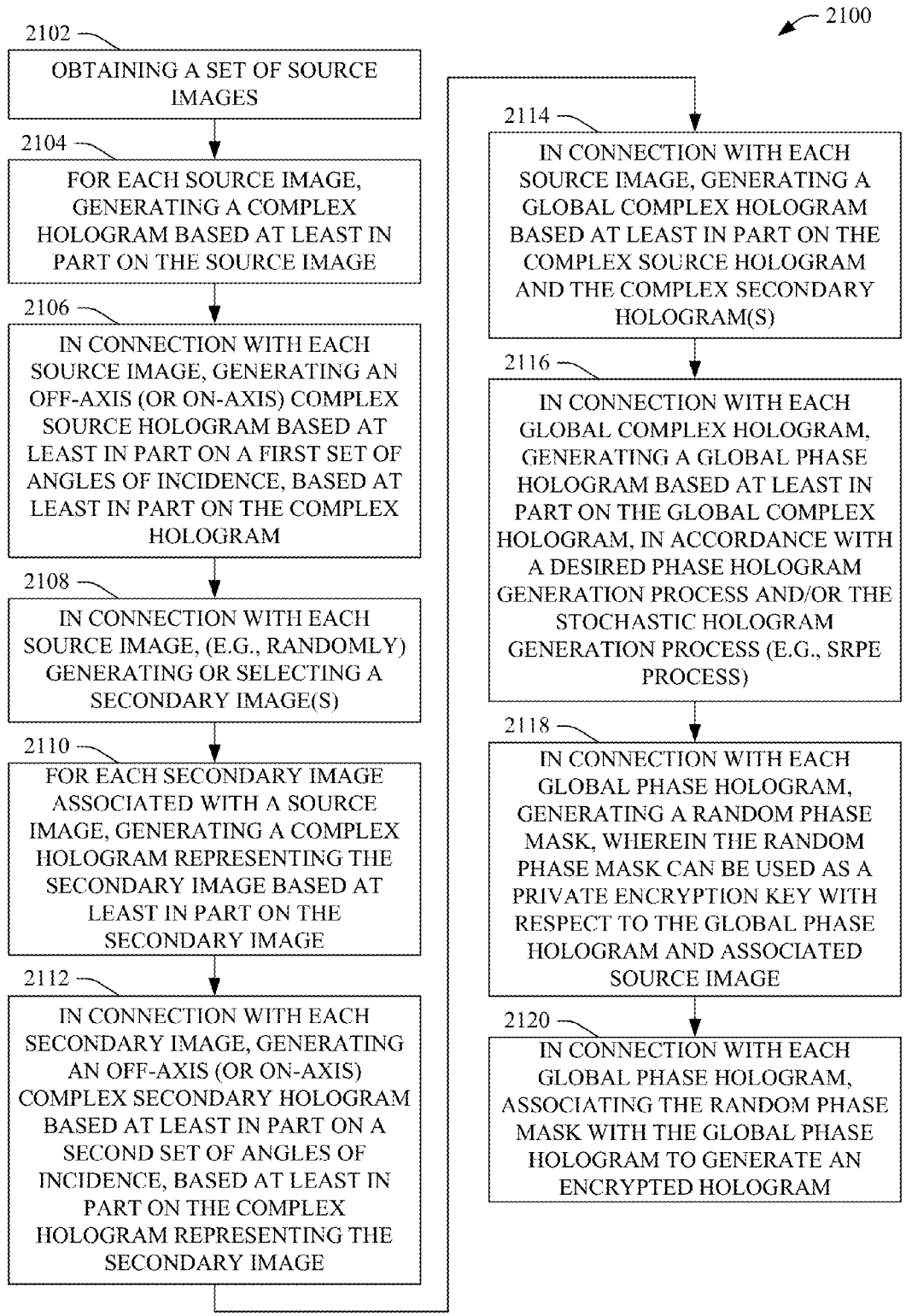
FIG. 21 illustrates a flow diagram of another example method that can facilitate encrypting content using a holographic cryptographic process, in accordance with various aspects and embodiments of the disclosed subject matter.
Figure 22:
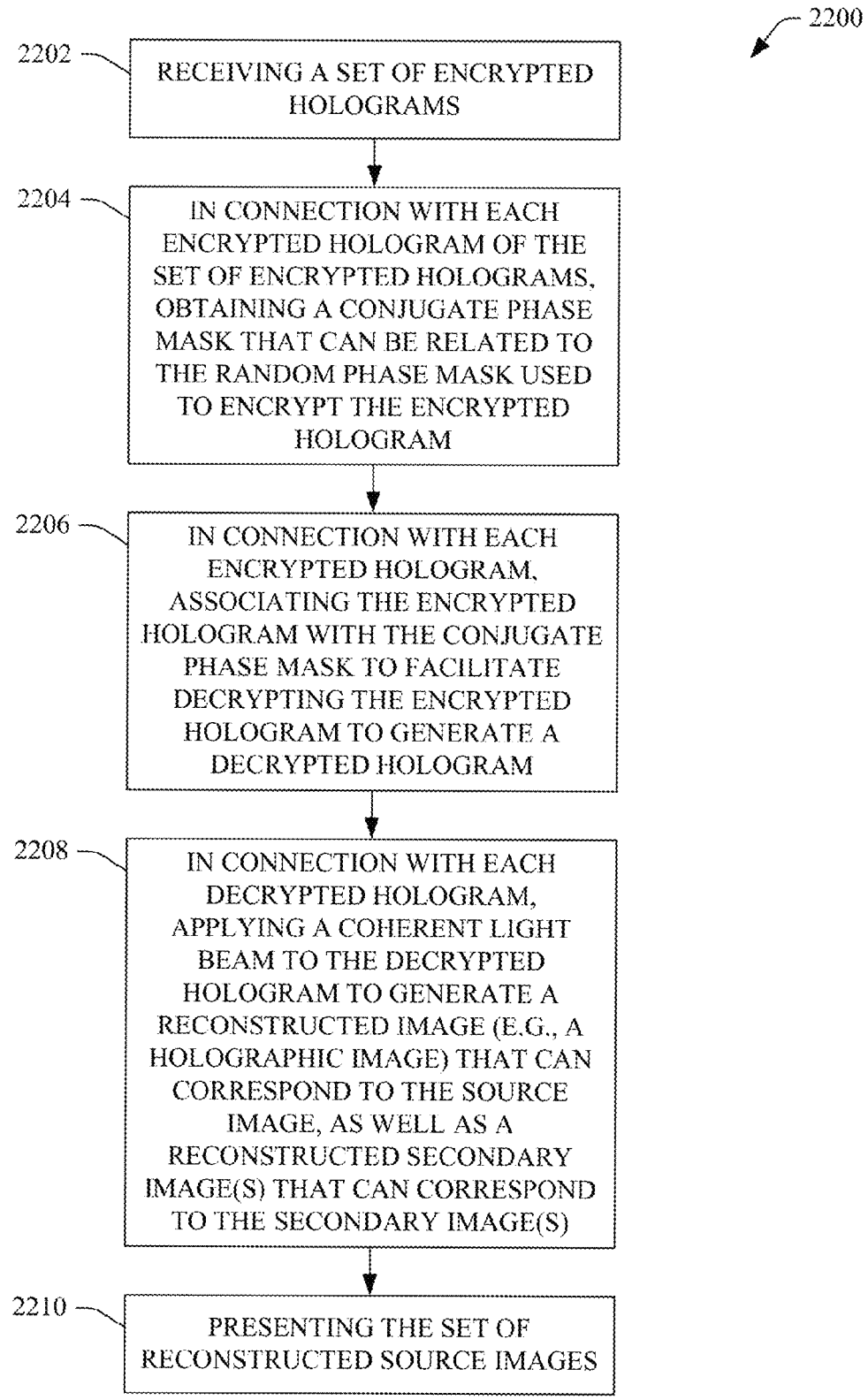
FIG. 22 depicts a flow diagram of an example method that can facilitate decrypting encrypted content using a holographic cryptographic process, in accordance with various aspects and embodiments of the disclosed subject matter.

FIGS. 20-22 illustrate methods and/or flow diagrams in accordance with the disclosed subject matter. For simplicity of explanation, the methods are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

Referring to FIG. 20, illustrated is a flow diagram of an example method 900 that can facilitate encrypting content (e.g., multi-dimensional visual images) using a holographic cryptographic process, in accordance with various aspects and embodiments of the disclosed subject matter. The method 2000 can be implemented by a holographic cryptographic component, for example.

At 2002, in connection with encryption of a set of source images (e.g., multi-dimensional source visual images) of an object scene, a set of phase holograms (e.g., a set of global phase holograms) can be generated, based at least in part on a set of complex holograms (e.g., a set of global complex holograms) that can be associated with the set of source images, by applying a phase hologram generation process and/or a stochastic hologram generation process (e.g., SRPE process) to the set of complex holograms. To facilitate encrypting the set of source images, the holographic cryptographic component can generate a set of complex holograms, based at least in part on the set of source images, using a desired complex hologram generation process. The holographic cryptographic component can maintain or modify (e.g., convert) the set of complex holograms to produce a set of on-axis or off-axis source complex holograms. With respect to each source image, the holographic cryptographic component can select or generate one or more secondary images, generate one or more complex holograms that can represent the one or more secondary images (e.g., using a desired complex hologram generation process), and maintain or modify the one or more secondary images to produce one or more on-axis or off-axis secondary complex holograms (having angles of incidence that can be different from the angles of incidence associated with the source complex hologram). The holographic cryptographic component can generate a set of global complex holograms, wherein, with respect to each source complex hologram, the holographic cryptographic component can generate a global complex hologram by combining the source complex hologram with a secondary complex hologram(s), as more fully disclosed herein. As part of generating the set of global complex holograms, the holographic cryptographic component can apply the stochastic hologram generation process to facilitate randomizing (e.g., via a random image(s) (e.g., a random secondary image(s)), a random variable(s) or random noise) the generation of the set of global complex holograms, as more fully disclosed herein. The holographic cryptographic component can convert the set of global complex holograms to a set of global phase holograms using a desired phase hologram generation process (e.g., BERD, LERDR, or UERD process).

At 2004, a set of encrypted holograms (e.g., encrypted random phase holograms) can be generated based at least in part on the set of phase holograms (e.g., the set of global phase holograms) and a random phase mask, wherein the set of phase holograms can represent, at least in part, the set of source images, and the random phase mask can be used as a private encryption key. The holographic cryptographic component can generate (e.g., randomly generate) a random phase mask to facilitate encrypting the set of source images (e.g., source image data) associated with and represented by the set of global phase holograms, wherein the random phase mask can be the private (e.g., secret) encryption key for the set of encrypted holograms being generated. The holographic cryptographic component can apply, add, integrate, multiply, or otherwise associate the random phase mask to, with, or by the one or more global phase holograms of the set of global phase holograms to generate the set of encrypted holograms (e.g., ciphertext holograms) that, at least in part, can represent or correspond to the set of source images (e.g., can comprise visual information corresponding to the source images in encrypted form). The resulting set of encrypted holograms can be white-noise ciphertext holograms that can be uncorrelated to the set of source images.

At the decoding end, to reconstruct the original source images (e.g., multi-dimensional visual images), a holographic cryptographic component (e.g., another holographic cryptographic component at the decoding end) can receive the set of encrypted holograms, for example, from memory or via the communication link (e.g., from a holographic cryptographic component at the encoding end). At the decoding end, the holographic cryptographic component can overlay or associate a phase mask (e.g., conjugate phase mask), which can inversely correspond to and/or be a conjugate of the encryption key, on or with the one or more encrypted holograms of the set of encrypted holograms, wherein the set of encrypted holograms, with the phase mask overlaid thereon or associated therewith, can be illuminated using a coherent light source to facilitate decrypting the set of encrypted holograms to facilitate generating and displaying a set of holographic images (e.g., reconstructed images), which can be reconstructed versions of, represent, and/or correspond to (e.g., at least can be substantially the same as) the set of source images. The set of source images only can be reconstructed properly if the correct phase mask is used. In some implementations, when a secondary image(s) is employed during the encryption process, an encrypted hologram also can comprise other information of the global phase holograms, such as information relating to the secondary image(s). When the encrypted hologram is decrypted using the conjugate phase mask and illuminating it with a coherent light source, a reconstructed secondary image(s) also can be generated, in addition to the reconstructed source image. As desired, the holographic cryptographic component can discard or mask off the reconstructed secondary image(s) so that it is not presented (e.g., displayed) by the display component.

FIG. 21 illustrates a flow diagram of another example method 2100 that can facilitate encrypting content (e.g., multi-dimensional visual images) using a holographic cryptographic process, in accordance with various aspects and embodiments of the disclosed subject matter. The method 2100 can be implemented by a holographic cryptographic component, for example.

At 2102, a set of source images can be obtained. The holographic cryptographic component can receive, generate, or otherwise obtain the set of source images that can represent a multi-dimensional (e.g., 3-D or 2-D) object scene, wherein a source image(s) of the set can be a multi-dimensional (e.g., 3-D or 2-D) visual image(s). The set of source images can comprise a single visual image not associated with other visual images (e.g., a photographic image or other solitary image), or can comprise a plurality of visual images, such as a series or sequence of visual images (e.g., as part of a video or video stream).

At 2104, for each source image of the set of source images, a complex hologram can be generated based at least in part on the source image. The holographic cryptographic component can generate a set of complex holograms, by deriving the set of complex holograms from the set of source images using a desired complex hologram generation process or algorithm. The set of complex holograms can represent or correspond to the set of source images.

At 2106, in connection with each source image of the set of source images, an off-axis (or on-axis) complex source hologram can be generated based at least in part on a first set of angles of incidence, based at least in part on the complex hologram representing the source image. In connection with each source image, the holographic cryptographic component can generate an off-axis (or on-axis) complex source hologram, by deriving the off-axis (or on-axis) complex source hologram from the complex hologram representing the source image, for example, by multiplying the complex hologram with an inclined plane wave with a first set of angles of incidence comprising respective angles of incidence along the x-direction and along the y-direction.

At 2108, in connection with each source image of the set of source images, a secondary image(s) can be generated (e.g., randomly generated) or selected (e.g., randomly selected) from a set of secondary images. In connection with each source image of the set of source images, the holographic cryptographic component can generate (e.g., randomly generate), or select (e.g., randomly select) from a set of secondary images, one or more secondary images. For instance, the holographic cryptographic component can generate or select the one or more secondary images in accordance with (e.g., using) a desired randomization algorithm and/or a random or pseudo-random number generator. A secondary image can be a multi-dimensional image that can be different from the source image.

At 2110, for each secondary image associated with a source image, a complex hologram representing the secondary image can be generated based at least in part on the secondary image. For each secondary image associated with a source image, the holographic cryptographic component can generate the complex hologram representing the secondary image, by deriving the complex hologram from the secondary image using a desired complex hologram generation process or algorithm. The complex hologram can represent or correspond to the secondary image.

At 2112, in connection with each secondary image, an off-axis (or on-axis) complex secondary hologram can be generated based at least in part on a second set of angles of incidence, based at least in part on the complex hologram representing the secondary image. In connection with each secondary image, the holographic cryptographic component can generate an off-axis (or on-axis) complex secondary hologram, by deriving the off-axis (or on-axis) complex secondary hologram from the complex hologram representing the secondary image, for example, by multiplying the complex hologram with an inclined plane wave with a second set of angles of incidence comprising respective angles of incidence along the x-direction and along the y-direction, wherein the second set of angles of incidence can be different from the first set of angles of incidence associated with the off-axis (or on-axis) complex source hologram that is associated with the off-axis (or on-axis) complex secondary hologram, as more fully described herein.

It is to be appreciated and understood that, if the source complex hologram is an on-axis complex hologram, the holographic cryptographic component can generate the secondary complex hologram(s) as an off-axis complex hologram, and, if the source complex hologram is an off-axis complex hologram having angles of incidence $\theta_{1;x}$ (along the x direction) and $\theta_{1;y}$ (along the y direction) (e.g., based on the angles of incidence of the plane wave), the holographic cryptographic component can generate the secondary complex hologram(s) as an on-axis complex hologram or as an off-axis complex hologram based at least in part on angles of incidence $\theta_{2;x;p}$ (along the x direction) and $\theta_{2;y;p}$ (along the y direction) (e.g., based on the angles of incidence of the plane wave), wherein the angular separation between ($\theta_{1;x},\theta_{1;y}$) of the source complex hologram and the orientation(s) of the secondary complex hologram(s) ($\theta_{2;y;p},\theta_{2;x;p}$) can be sufficiently large enough so that, during decoding of the encrypted hologram, the respective source image and secondary images can be formed at non-overlapping areas on the focused plane, and the reconstructed source image can be observed visually at its original position without any geometrical changes.

At 2114, in connection with each source image, a global complex hologram can be generated based at least in part on the complex source hologram and the complex secondary hologram(s). With respect to each secondary image, the holographic cryptographic component can generate the global complex hologram based at least in part on the complex source hologram and the complex secondary hologram(s). For instance, the holographic cryptographic component can sum, combine, or integrate the complex source hologram and the complex secondary hologram(s) to generate the global complex hologram.

At 2116, in connection with each global complex hologram, a global phase hologram can be generated based at least in part on the global complex hologram, in accordance with a desired phase hologram generation process and/or the stochastic hologram generation process (e.g., SRPE process). The holographic cryptographic component can employ the desired phase hologram generation process (e.g., BERD process, LERDR process, UERD process) to generate the global phase hologram (e.g., a global POH) that, at least in part, can represent or correspond to the source image based at least in part on the global complex hologram.

At 2118, in connection with each global phase hologram, a random phase mask can be generated, wherein the random phase mask can be used as a private encryption key with respect to the global phase hologram and associated (e.g., incorporated) source image. With respect to each global phase hologram, the holographic cryptographic component can determine and generate (e.g., randomly generate) a phase mask (e.g., a random phase mask), wherein the phase mask can be employed as the private encryption key with respect to the global phase hologram and encryption of the information (e.g., image data of the source image) therein. For instance, the holographic cryptographic component can determine and generate the random phase mask in accordance with (e.g., using) a desired randomization algorithm and/or a random or pseudo-random number generator.

At 2120, in connection with each global phase hologram, the random phase mask can be associated with the global phase hologram to generate an encrypted hologram. In connection with each global phase hologram, the holographic cryptographic component can apply, add, integrate, multiply, or otherwise associate the random phase mask to, with, or by a global phase hologram to generate an encrypted hologram. The encrypted hologram can be referred to, for example, as a ciphertext hologram or a random encrypted phase hologram.

The holographic cryptographic component can store the set of encrypted holograms associated with the set of source images in a data store and/or on single static media, such as photographic film or a printout, and/or can communicate the set of encrypted holograms to another device or component (e.g., a holographic cryptographic component at the decoding end) via a wireline or wireless communication link for decrypting of the set of encrypted holograms and reconstructing of the set of source images at the decoding end, as more fully disclosed herein.

Referring to FIG. 22, depicted is a flow diagram of an example method 2200 that can facilitate decrypting encrypted content (e.g., multi-dimensional visual images) using a holographic cryptographic process, in accordance with various aspects and embodiments of the disclosed subject matter. The method 2200 can be implemented by a holographic cryptographic component (e.g., at the decoding or decryption end), for example. In some implementations, the method 2200 can be realized optically or numerically.

At 2202, a set of encrypted holograms can be received. The holographic cryptographic component can receive the set of encrypted holograms from memory (e.g., data store), another holographic cryptographic component or another component (e.g., via a wireless or wireline communication link), or from another source.

At 2204, in connection with each encrypted hologram of the set of encrypted holograms, a conjugate phase mask can be obtained, wherein the conjugate phase mask can be related to the random phase mask used to encrypt the encrypted hologram. With respect to each encrypted hologram, the holographic cryptographic component can generate, receive, or otherwise obtain the conjugate phase mask, wherein the conjugate phase mask can inversely correspond with, be the conjugate of, or otherwise be related to, the random phase mask used to encrypt the global phase hologram to generate the encrypted hologram (e.g., the ciphertext hologram or random encrypted phase hologram) at the encoding end. For example, the holographic cryptographic component can be associated with an authorized entity (e.g., authorized user or device) that is authorized to access the set of source images, and the set of conjugate phase masks that can be associated with the set of encrypted holograms (and associated set of source images encrypted therein), or information that can facilitate generating the set of conjugate phase masks, can be provided to the holographic cryptographic component to enable the holographic cryptographic component to decrypt the set of encrypted holograms, which can comprise information (e.g., image data) of the set of source images, in encrypted form, and to reconstruct and display the set of source images (e.g., as a set of holographic images on a display screen of a display component).

At 2206, in connection with each encrypted hologram, the encrypted hologram can be associated with the conjugate phase mask to facilitate decrypting the encrypted hologram to generate a decrypted hologram. The holographic cryptographic component can overlay, integrate, apply, multiply, or otherwise associate the conjugate phase mask on, with, or by the encrypted hologram to generate the decrypted hologram. The conjugate phase mask can inversely correspond to or be the conjugate of the random phase mask that was used to encrypt the global phase hologram to generate the encrypted hologram at the encoder end.

At 2208, in connection with each decrypted hologram, a coherent light beam can be applied to the decrypted hologram to generate a reconstructed image (e.g., a holographic image) that can correspond to the source image, as well as a reconstructed secondary image(s) that can correspond to the secondary image(s). With respect to each decrypted hologram, the holographic cryptographic component or display component can generate a coherent light beam and can apply the coherent light beam to the decrypted hologram to illuminate the decrypted hologram to facilitate reconstructing and/or displaying a visual image (e.g., a holographic image) that can represent and correspond to the source image. As the decrypted hologram also comprised information relating to the secondary image(s), applying the coherent light beam to the decrypted hologram to illuminate it can facilitate reconstructing a visual image(s) of the secondary image(s). Due to the different angles of incidence applied to the source image and the secondary image(s) at the encoding end, the source image and the secondary image(s), and thus, the reconstructed source image and reconstruction secondary image(s), can be non-overlapping with respect to each other such that the reconstructed secondary image(s) will not degrade the quality of or interfere with the reconstructed source image.

At 2210, the set of reconstructed source images can be presented. The display component can present (e.g., display) the set of reconstructed visual images (e.g., set of holographic images), which represent and correspond to the set of source images, for viewing by one or more viewers. In some implementations, the display component can be or can comprise, for example, a phase-only display device (e.g., a phase-only SLM display device, a phase-only LCoS display device) that can be used to display the set of reconstructed source images. As desired, with respect to each reconstructed source image, the holographic cryptographic component or display component can discard or mask off (to remove) the reconstructed secondary image(s) associated with the same decrypted hologram as the reconstructed source image.

Figure 23:
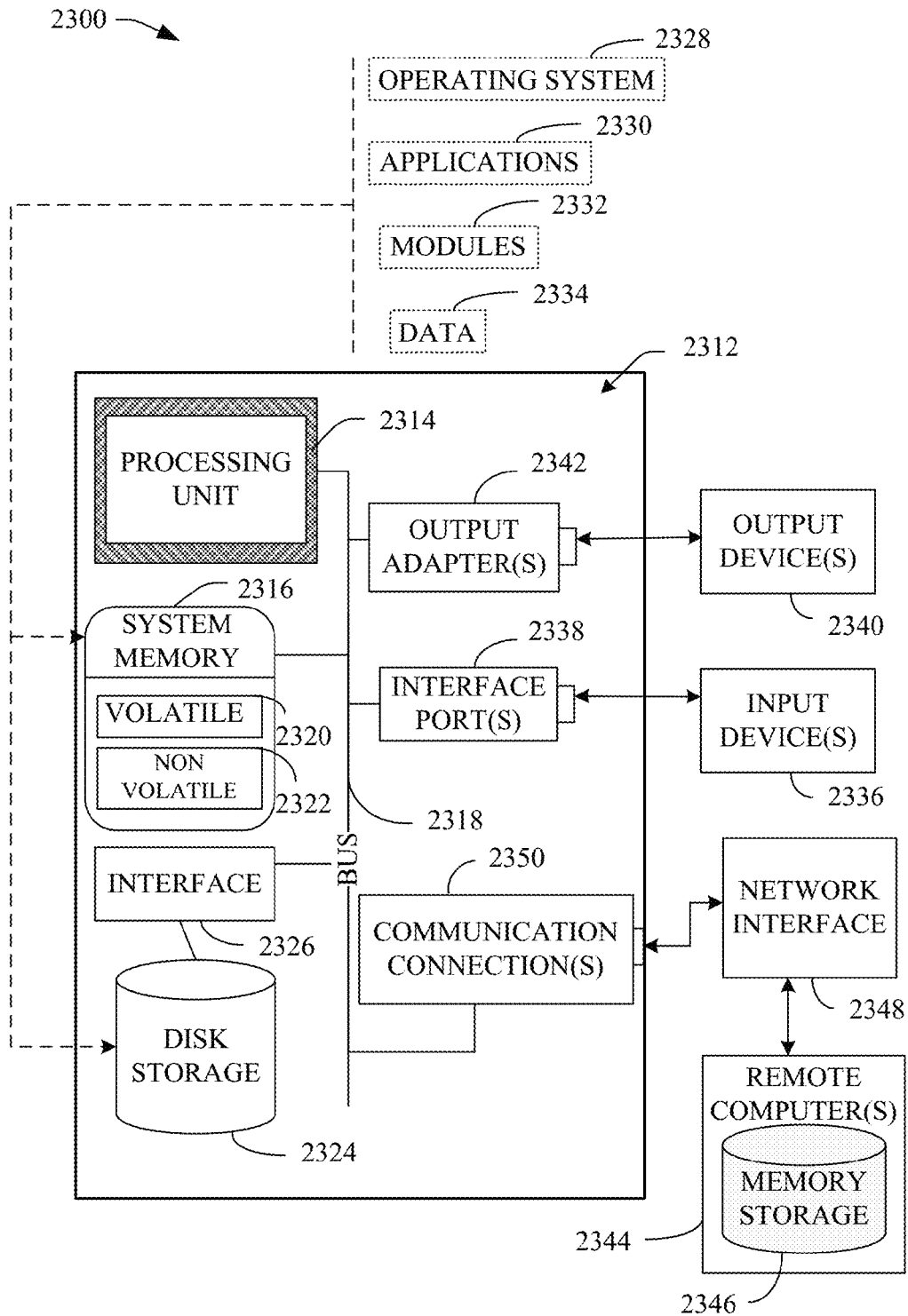
FIG. 23 is a schematic block diagram illustrating a suitable operating environment.
Figure 24:
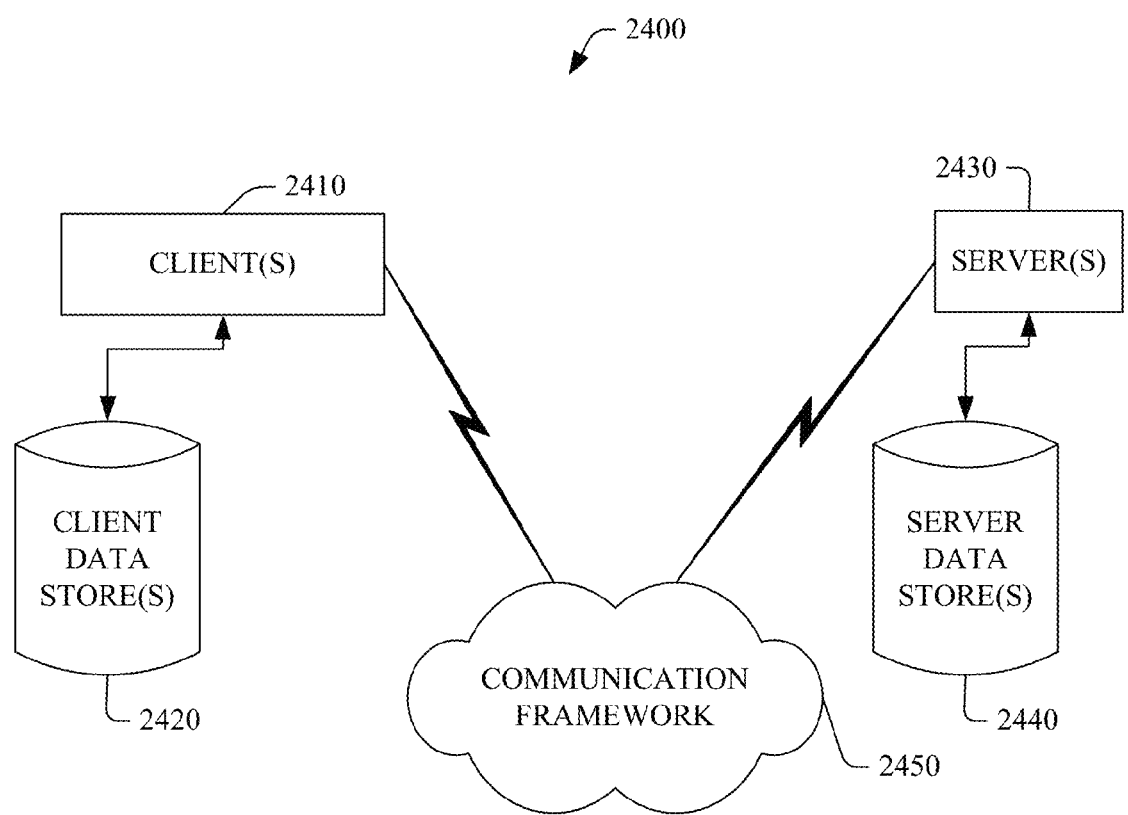
FIG. 24 is a schematic block diagram of a sample-computing environment.

In order to provide a context for the various aspects of the disclosed subject matter, FIGS. 23 and 24 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject disclosure also may be implemented in combination with other program modules. Generally, program modules include routines, programs, components, data structures, etc. that perform particular tasks and/or implement particular abstract data types. Moreover, those skilled in the art will appreciate that the methods may be practiced with other computer system configurations, including single-processor or multiprocessor computer systems, mini-computing devices, mainframe computers, as well as personal computers, hand-held computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the subject disclosure can be practiced on stand-alone computers. In a distributed computing environment, program modules may be located in both local and remote memory storage devices.

With reference to FIG. 23, a suitable environment 2300 for implementing various aspects of the claimed subject matter includes a computer 2312. The computer 2312 includes a processing unit 2314, a system memory 2316, and a system bus 2318. It is to be appreciated that the computer 2312 can be used in connection with implementing one or more of the systems or components (e.g., holographic cryptographic component, display component, processor component, data store, etc.) shown and/or described in connection with, for example, FIGS. 1-22. The system bus 2318 couples system components including, but not limited to, the system memory 2316 to the processing unit 2314. The processing unit 2314 can be any of various available processors. Dual microprocessors and other multiprocessor architectures also can be employed as the processing unit 2314.

The system bus 2318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 2316 includes volatile memory 2320 and nonvolatile memory 2322. The basic input/output system (BIOS), containing the basic routines to transfer information between elements within the computer 2312, such as during start-up, is stored in nonvolatile memory 2322. By way of illustration, and not limitation, nonvolatile memory 2322 can include read only memory (ROM), programmable ROM (PROM), electrically programmable ROM (EPROM), electrically erasable programmable ROM (EEPROM), or flash memory. Volatile memory 2320 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2312 also can include removable/non-removable, volatile/non-volatile computer storage media. FIG. 23 illustrates, for example, a disk storage 2324. Disk storage 2324 includes, but is not limited to, devices like a magnetic disk drive, floppy disk drive, tape drive, Jaz drive, Zip drive, LS-100 drive, flash memory card, or memory stick. In addition, disk storage 2324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2324 to the system bus 2318, a removable or non-removable interface is typically used, such as interface 2326).

It is to be appreciated that FIG. 23 describes software that acts as an intermediary between users and the basic computer resources described in the suitable operating environment 2300. Such software includes an operating system 2328. Operating system 2328, which can be stored on disk storage 2324, acts to control and allocate resources of the computer system 2312. System applications 2330 take advantage of the management of resources by operating system 2328 through program modules 2332 and program data 2334 stored either in system memory 2316 or on disk storage 2324. It is to be appreciated that the claimed subject matter can be implemented with various operating systems or combinations of operating systems.

A user enters commands or information into the computer 2312 through input device(s) 2336. Input devices 2336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2314 through the system bus 2318 via interface port(s) 2338. Interface port(s) 2338 include, for example, a serial port, a parallel port, a game port, and a universal serial bus (USB). Output device(s) 2340 use some of the same type of ports as input device(s) 2336. Thus, for example, a USB port may be used to provide input to computer 2312, and to output information from computer 2312 to an output device 2340. Output adapter 2342 is provided to illustrate that there are some output devices 2340 like monitors, speakers, and printers, among other output devices 2340, which require special adapters. The output adapters 2342 include, by way of illustration and not limitation, video and sound cards that provide a means of connection between the output device 2340 and the system bus 2318. It should be noted that other devices and/or systems of devices provide both input and output capabilities such as remote computer(s) 2344.

Computer 2312 can operate in a networked environment using logical connections to one or more remote computers, such as remote computer(s) 2344. The remote computer(s) 2344 can be a personal computer, a server, a router, a network PC, a workstation, a microprocessor based appliance, a peer device or other common network node and the like, and typically includes many or all of the elements described relative to computer 2312. For purposes of brevity, only a memory storage device 2346 is illustrated with remote computer(s) 2344. Remote computer(s) 2344 is logically connected to computer 2312 through a network interface 2348 and then physically connected via communication connection 2350. Network interface 2348 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2350 refers to the hardware/software employed to connect the network interface 2348 to the bus 2318. While communication connection 2350 is shown for illustrative clarity inside computer 2312, it can also be external to computer 2312. The hardware/software necessary for connection to the network interface 2348 includes, for exemplary purposes only, internal and external technologies such as, modems including regular telephone grade modems, cable modems and DSL modems, ISDN adapters, and Ethernet cards.

FIG. 24 is a schematic block diagram of a sample-computing environment 2400 with which the subject disclosure can interact. The system 2400 includes one or more client(s) 2410. The client(s) 2410 can be hardware and/or software (e.g., threads, processes, computing devices). The system 2400 also includes one or more server(s) 2430. Thus, system 2400 can correspond to a two-tier client server model or a multi-tier model (e.g., client, middle tier server, data server), amongst other models. The server(s) 2430 can also be hardware and/or software (e.g., threads, processes, computing devices). The servers 2430 can house threads to perform transformations by employing the subject disclosure, for example. One possible communication between a client 2410 and a server 2430 may be in the form of a data packet transmitted between two or more computer processes.

The system 2400 includes a communication framework 2450 that can be employed to facilitate communications between the client(s) 2410 and the server(s) 2430. The client(s) 2410 are operatively connected to one or more client data store(s) 2420 that can be employed to store information local to the client(s) 2410. Similarly, the server(s) 2430 are operatively connected to one or more server data store(s) 2440 that can be employed to store information local to the servers 2430.

It is to be appreciated and understood that components (e.g., holographic cryptographic component, display component, encoder component, decoder component, processor component, data store, or other component(s)), as described with regard to a particular system or method, can include the same or similar functionality as respective components (e.g., respectively named components or similarly named components) as described with regard to other systems or methods disclosed herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As utilized herein, terms "component," "system," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein can encompass a computer program accessible from any computer-readable device, carrier, or media. For example, computer readable media can include, but is not limited to, magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). As used and defined herein, the term "computer-readable storage device" excludes transitory storage media. Of course, those skilled in the art will recognize many modifications can be made to this configuration without departing from the scope or spirit of the disclosed subject matter.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a graphics processing unit (GPU), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

Some portions of the detailed description have been presented in terms of algorithms and/or symbolic representations of operations on data bits within a computer memory. These algorithmic descriptions and/or representations are the means employed by those cognizant in the art to effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
at least one memory that stores executable components; and
at least one processor, coupled to the at least one memory, that executes or facilitates execution of the executable components, the executable components comprising:
a hologram generator component that generates a set of complex holograms based at least in part on a set of source images of a multi-dimensional object scene; and
a holographic cryptographic component that applies a stochastic hologram generation process to facilitate generation of the set of complex holograms, to facilitate generation of a set of phase holograms based at least in part on the set of complex holograms, and to encrypt the set of phase holograms using a random phase mask as a private encryption key, wherein the set of phase holograms represents, at least in part, the set of source images, wherein the set of phase holograms is generated based at least in part on random information derived from the stochastic hologram generation process, and wherein the holographic cryptographic component generates the random phase mask and associates the random phase mask with a phase hologram of the set of phase holograms to encrypt the phase hologram to generate an encrypted hologram.

2. The system of claim 1, wherein a complex hologram of the set of complex holograms comprises a magnitude portion and a phase portion, and wherein the holographic cryptographic component converts the complex hologram to a phase hologram of the set of phase holograms that comprises the phase portion.

3. The system of claim 2, wherein the phase hologram is a phase-only hologram.

4. The system of claim 1, wherein the set of phase holograms is a set of global phase holograms, wherein, in connection with a source image of the set of source images, the holographic cryptographic component generates a complex source hologram of the set of complex holograms based at least in part on a first set of angles of incidence along a first direction and along a second direction, and wherein the complex source hologram represents and is based at least in part on the source image.

5. The system of claim 4, wherein the holographic cryptographic component at least one of randomly generates a secondary image or randomly selects the secondary image from a set of secondary images, and generates a complex secondary hologram that represents and is based at least in part on the secondary image.

6. The system of claim 5, wherein the holographic cryptographic component generates the complex secondary hologram based at least in part on a second set of angles of incidence along the first direction and along the second direction.

7. The system of claim 6, wherein the holographic cryptographic component generates a global complex hologram based at least in part on the complex source hologram and the complex secondary hologram.

8. The system of claim 7, wherein the holographic cryptographic component sums the complex source hologram with the complex secondary hologram to generate the global complex hologram.

9. The system of claim 7, wherein the holographic cryptographic component generates a global phase hologram of the set of global phase holograms based at least in part on the global complex hologram.

10. The system of claim 9, wherein the holographic cryptographic component generates the random phase mask and associates the random phase mask with the global phase hologram to generate the encrypted hologram of the encrypted holograms.

11. The system of claim 1, wherein the holographic cryptographic component applies the random phase mask to the phase hologram of the set of phase holograms to encrypt the phase holograms to generate the encrypted hologram.

12. The system of claim 1, wherein the encrypted holograms are able to be decrypted to generate decrypted holograms by association of a conjugate phase mask with the encrypted holograms, wherein reconstructed source images are able to be generated by illuminating the decrypted holograms with a coherent light beam, wherein the conjugate phase mask is a conjugate of the random phase mask, and wherein the reconstructed source images correspond to source images of the set of source images.

13. The system of claim 1, wherein, with regard to the set of complex holograms, the holographic cryptographic component is configured to be able to generate respective sets of different phase holograms in connection with respective applications of the stochastic hologram generation process to the set of complex holograms based at least in part on respective items of random information derived from the stochastic hologram generation process.

14. The system of claim 1, wherein the set of source images are a set of three-dimensional source images, and wherein the holographic cryptographic component generates the set of phase holograms as a set of three-dimensional phase holograms that preserve full parallax and depth information of the set of three-dimensional source images to facilitate display of a set of reconstructed three-dimensional holographic images that contain the full parallax and depth information of the set of three-dimensional source images.

15. The system of claim 14, wherein the full parallax and depth information comprises full vertical and horizontal parallax information.

16. The system of claim 1, wherein a source image of the set of source images is a two-dimensional or a three-dimensional source image.

17. A system, comprising:
at least one memory that stores executable components; and
at least one processor, coupled to the at least one memory, that executes or facilitates execution of the executable components, the executable components comprising:
a holographic cryptographic component that receives a set of encrypted holograms associated with a set of source images and decrypts the set of encrypted holograms to generate a set of decrypted holograms based at least in part on a conjugate phase mask, wherein the set of encrypted holograms is based at least in part on a set of phase holograms that represent, at least in part, the set of source images and are derived from a set of complex holograms via a stochastic hologram generation process, wherein a random phase mask is generated and associated with the set of phase holograms to encrypt the set of phase holograms to generate the set of encrypted holograms, and wherein the conjugate phase mask inversely corresponds to the random phase mask used to encrypt the set of phase holograms to generate the set of encrypted holograms; and
a display component that presents a set of holographic images that is generated in response to illumination of at least a portion of the set of decrypted holograms using a coherent light beam, wherein the set of holographic images reconstruct and correspond to the set of source images.

18. The system of claim 17, wherein the holographic cryptographic component associates the conjugate phase mask with the set of encrypted holograms to facilitate decryption of the set of encrypted holograms.

19. The system of claim 18, wherein, to associate the conjugate phase mask with the set of encrypted holograms, the holographic cryptographic component overlays, applies, or multiplies, the conjugate phase mask on, to, or by the set of encrypted holograms to facilitate the decryption of the set of encrypted holograms.

20. The system of claim 17, wherein an encrypted hologram of the set of encrypted holograms is generated based at least in part on a global phase hologram of the set of phase holograms and the random phase mask, wherein the global phase hologram is generated based at least in part on a source image of the set of source images and a secondary image, wherein the secondary image is randomly generated or randomly selected, wherein the holographic cryptographic component associates the conjugate phase mask with the encrypted hologram to facilitate generating a decrypted hologram, and wherein the display component presents a holographic image that reconstructs the source image and is generated in response to illumination of the decrypted hologram using a coherent light beam.

21. The system of claim 20, wherein the holographic cryptographic component or the display component discards information relating to the secondary image that is contained in the decrypted hologram to facilitate presentation of only the holographic image that reconstructs the source image via the display component.

22. The system of claim 17, wherein the display component comprises a phase-only display device.

23. The system of claim 22, wherein the display component comprises at least one of a phase-only spatial light modulator display device, a phase-only liquid crystal on silicon display device, or a phase-only liquid crystal display device.

24. The system of claim 17, wherein the set of source images is a set of multi-dimensional source images that comprises two-dimensional or three-dimensional source images.

25. The system of claim 24, wherein the set of holographic images contain full parallax information and depth information of the set of multi-dimensional source images, and wherein the full parallax information comprises horizontal parallax information and vertical parallax information.

26. A method, comprising:
generating, by a system comprising a processor, a set of phase holograms from a set of complex holograms based at least in part on applying a stochastic hologram generation process in connection with generating the set of complex holograms, wherein the set of phase holograms is generated based at least in part on random information derived from the stochastic hologram generation process, and wherein the set of phase holograms represents, at least in part, a set of source images of a multi-dimensional object scene; and
encrypting, by the system, the set of phase holograms based at least in part on a random phase mask, wherein the random phase mask is generated and associated with the set of phase holograms to encrypt the set of phase holograms to generate a set of encrypted holograms.

27. The method of claim 26, further comprising:
generating, by the system, the random phase mask based at least in part on a defined randomizing function; and
associating, by the system, the random phase mask with a phase hologram of the set of phase holograms to facilitate the encrypting of the set of phase holograms, wherein the random phase mask is used as a private encryption key to facilitate the encrypting of the phase hologram.

28. The method of claim 26, further comprising:
generating, by the system, a set of complex holograms, comprising a magnitude portion and a phase portion; and
modifying, by the system, a subset of the set of complex holograms to facilitate generating the set of phase holograms, comprising the phase portion, by applying the stochastic hologram generation process to the set of complex holograms.

29. The method of claim 28, wherein the set of phase holograms is a set of phase-only holograms.

30. The method of claim 26, further comprising:
in connection with a source image of the set of source images, generating, by the system, a complex source hologram of the set of complex holograms based at least in part on a first set of angles of incidence along a first direction and along a second direction, wherein the complex source hologram represents and is based at least in part on the source image;
at least one of generating or selecting, by the system, a secondary image, wherein the random information comprises the secondary image; and
generating, by the system, a complex secondary hologram based at least in part on a second set of angles of incidence along the first direction and along the second direction, wherein the complex secondary hologram represents and is based at least in part on the secondary image.

31. The method of claim 30, further comprising:
generating, by the system, a global complex hologram of the set of complex holograms based at least in part on the complex source hologram and the complex secondary hologram;
converting, by the system, the global complex hologram to a global phase hologram of the set of phase holograms;
generating, by the system, the random phase mask; and
associating, by the system, the random phase mask with the global phase hologram to generate an encrypted hologram of the set of encrypted holograms that comprises an encrypted version of the source image.

32. The method of claim 26, further comprising:
communicating, by the system, the set of encrypted holograms to a decryption device, wherein the set of encrypted holograms is decryptable to generate a set of decrypted holograms by associating a conjugate phase mask with the set of encrypted holograms, wherein a set of holographic images that reconstruct and correspond to the set of source images is able to be generated by illuminating the set of decrypted holograms with a coherent light beam, and wherein the conjugate phase mask inversely corresponds to the random phase mask.

33. The method of claim 26, wherein the set of source images is a set of two-dimensional or three-dimensional source images, wherein the set of phase holograms comprises full parallax information and depth information of the set of two-dimensional or three-dimensional source images, and wherein the full parallax information comprises horizontal parallax information and vertical parallax information.

34. A non-transitory computer-readable medium storing computer-executable instructions that, in response to execution, cause a system comprising a processor to perform operations, comprising:
generating a set of phase-only holograms from a set of complex holograms based at least in part on applying a stochastic hologram generation process during generating of the set of complex holograms, wherein the set of phase-only holograms is based at least in part on random data generated during the stochastic hologram generation process, and wherein the set of phase-only holograms represents, at least in part, a set of source images of a multidimensional object scene; and
encrypting the set of phase-only holograms based at least in part on a random phase mask, wherein the random phase mask is generated and associated with the set of phase-only holograms to encrypt the set of phase-only holograms to generate a set of encrypted holograms.

35. The non-transitory computer-readable medium of claim 34, wherein the operations further comprise:
generating the random phase mask based at least in part on a defined randomizing function; and
applying the random phase mask to the set of phase-only holograms to facilitate the encrypting of the set of phase-only holograms, wherein the random phase mask is used as a secret encryption key to facilitate the encrypting of the set of phase-only holograms.

36. A system, comprising:

means for generating a set of phase holograms based at least in part on a stochastic hologram generation process that is applied to a set of complex holograms, wherein the set of phase holograms is generated based at least in part on random information generated during the stochastic hologram generation process, and wherein the set of phase holograms represents, at least in part, a set of multi-dimensional source images of a multi-dimensional object scene; and means for encrypting the set of phase holograms based at least in part on a random phase mask, wherein the random phase mask is generated and associated with the set of phase holograms to encrypt the set of phase holograms to generate a set of encrypted holograms.

37. The system of claim 36, further comprising:

means for generating the random phase mask based at least in part on a defined randomizing function; and means for applying the random phase mask to the set of phase holograms to facilitate the encrypting of the set of phase holograms, wherein the random phase mask is used as a private encryption key in connection with the encrypting of the set of phase holograms.

* * * * *